(12) United States Patent
Yaghmour

(10) Patent No.: US 11,385,601 B2
(45) Date of Patent: Jul. 12, 2022

(54) WATCH MODULE CONNECTOR

(71) Applicant: Karim Jean Yaghmour, Sherbrooke (CA)

(72) Inventor: Karim Jean Yaghmour, Sherbrooke (CA)

( * ) Notice: Subject to any disclaimer, the term of this patent is extended or adjusted under 35 U.S.C. 154(b) by 568 days.

(21) Appl. No.: 16/181,192

(22) Filed: Nov. 5, 2018

(65) Prior Publication Data

US 2019/0137948 A1   May 9, 2019

Related U.S. Application Data

(60) Provisional application No. 62/581,773, filed on Nov. 5, 2017.

(51) Int. Cl.
*G04G 17/06* (2006.01)
*G04G 21/00* (2010.01)
(Continued)

(52) U.S. Cl.
CPC ............ *G04G 17/06* (2013.01); *G04G 17/04* (2013.01); *G04G 21/00* (2013.01); *G04G 21/02* (2013.01);
(Continued)

(58) Field of Classification Search
CPC ........ G04G 17/06; G04G 17/04; G04G 21/00; G04G 21/02; G04G 21/04; G04G 17/08;
(Continued)

(56) References Cited

U.S. PATENT DOCUMENTS

| 3,973,706 A | 8/1976 | Boyce |
| 4,063,410 A | 12/1977 | Welling |

(Continued)

FOREIGN PATENT DOCUMENTS

| WO | 1998032057 | 7/1998 |
| WO | 2000038393 | 6/2000 |

OTHER PUBLICATIONS

Wikipedia, "Bus (computing)" https://en.wikipedia.org/wiki/Bus_(computing) last version of record as published as of the priority date of Nov. 5, 2017, as retrieved on Nov. 8, 2021. 5 pages.

(Continued)

*Primary Examiner* — Edwin A. Leon

(57) ABSTRACT

A wrist-wearable device comprises a module connector for enabling the connection of modules while the wrist-wearable device remains actively worn by a user. Several connectors can be devised following a similar set of rules that provide mechanical, electrical and possibly sealing connectivity between a wrist-wearable device and a module while still being operable with one hand by their users. Locking features and mechanisms and corresponding non-trivial, yet one-hand operable unlocking mechanisms for module release can be used to secure modules against wrist-wearable devices. Such a connector system as applied to a watch enables watch functionality to be extended and/or enhanced without requiring replacement of the watch itself while still offering users an effective user experience that enables them to connect and disconnect modules throughout the day without having to take their watch off.

32 Claims, 12 Drawing Sheets

(51) Int. Cl.
| | | |
|---|---|---|
| *H01R 13/24* | (2006.01) | |
| *H01R 13/52* | (2006.01) | |
| *H01R 13/627* | (2006.01) | |
| *G04G 17/04* | (2006.01) | |
| *G04G 21/02* | (2010.01) | |
| *G04G 21/04* | (2013.01) | |
| *G06F 1/16* | (2006.01) | |
| *G06F 1/3212* | (2019.01) | |

(52) U.S. Cl.
CPC ............. *G04G 21/04* (2013.01); *G06F 1/163* (2013.01); *G06F 1/1658* (2013.01); *G06F 1/3212* (2013.01); *H01R 13/2471* (2013.01); *H01R 13/5219* (2013.01); *H01R 13/6271* (2013.01); *H01R 13/6275* (2013.01); *H01R 13/24* (2013.01)

(58) Field of Classification Search
CPC ...... G06F 1/163; G06F 1/1658; G06F 1/3212; H01R 13/2471; H01R 13/5219; H01R 13/6271; H01R 13/6275; H01R 13/24; G04B 37/084; G04C 10/00
USPC .......................................................... 368/10
See application file for complete search history.

(56) References Cited

U.S. PATENT DOCUMENTS

| | | | |
|---|---|---|---|
| 4,586,827 A | 5/1986 | Hirsch | |
| 4,629,329 A * | 12/1986 | Komiyama | H04B 1/088 368/10 |
| 4,646,157 A | 2/1987 | Wakai | |
| 4,819,860 A | 4/1989 | Hargrove | |
| 4,847,818 A | 7/1989 | Olsen | |
| 4,853,682 A | 8/1989 | Asano | |
| 5,136,557 A | 8/1992 | Plawker | |
| 5,265,272 A | 11/1993 | Kurcbart | |
| 5,781,511 A * | 7/1998 | Yasukawa | A61B 5/02438 368/10 |
| 5,872,744 A | 2/1999 | Taylor | |
| 5,943,302 A | 8/1999 | Fanshaw | |
| 6,212,414 B1 | 4/2001 | Alamch | |
| 6,233,203 B1 * | 5/2001 | Kawata | G04C 10/00 368/10 |
| 6,249,487 B1 * | 6/2001 | Yano | G01S 19/34 342/357.74 |
| 6,454,608 B1 * | 9/2002 | Kitahara | H01R 13/2421 439/358 |
| 6,536,941 B1 | 3/2003 | Fang | |
| 6,549,791 B1 | 4/2003 | Jeon | |
| 6,619,835 B2 | 9/2003 | Kita | |
| 6,619,836 B1 | 9/2003 | Silvant | |
| 7,229,323 B2 * | 6/2007 | Robin | G04C 10/00 439/638 |
| 7,618,260 B2 | 11/2009 | Daniel | |
| 7,764,488 B2 | 7/2010 | Calvarese | |
| 8,345,414 B2 | 1/2013 | Mooring | |
| 8,787,006 B2 | 7/2014 | Golko | |
| 8,976,628 B2 * | 3/2015 | Leoni | G04G 17/06 368/10 |
| D729,650 S | 5/2015 | Phillips | |
| 9,118,750 B2 | 8/2015 | Vossoughi | |
| 9,274,506 B2 | 3/2016 | Lu | |
| 9,395,696 B2 | 7/2016 | Pegg | |
| D772,870 S | 11/2016 | Park | |
| 9,553,625 B2 | 1/2017 | Hatanaka | |
| 9,579,022 B2 * | 2/2017 | Chang | G06F 1/163 |
| 9,615,791 B2 | 4/2017 | Zhang | |
| 9,621,229 B2 | 4/2017 | Fishman | |
| 9,668,367 B2 | 5/2017 | Fleck | |
| 9,674,336 B2 | 6/2017 | Yaghmour | |
| 9,917,936 B2 | 3/2018 | Gadi | |
| 10,101,884 B2 | 10/2018 | Dipin | |
| 10,606,216 B2 | 3/2020 | Dubois | |
| 10,945,496 B2 | 3/2021 | Perkinds | |
| 11,163,460 B2 | 11/2021 | Yaghmour | |
| 2001/0004397 A1 | 6/2001 | Kita et al. | |
| 2005/0083789 A1 | 4/2005 | Matatov | |
| 2007/0064542 A1 * | 3/2007 | Fukushima | G04G 17/06 368/282 |
| 2007/0253290 A1 | 11/2007 | Aire | |
| 2008/0310260 A1 | 12/2008 | Segal | |
| 2015/0131215 A1 * | 5/2015 | Huang | G06F 1/1632 361/679.03 |
| 2016/0066660 A1 | 3/2016 | Pluemer | |
| 2016/0241688 A1 | 8/2016 | Vossoughi | |
| 2017/0329288 A1 | 11/2017 | Cho | |
| 2019/0137947 A1 | 5/2019 | Yaghmour | |

OTHER PUBLICATIONS

Wikipedia, "Electrical connector" https://en.wikipedia.org/wiki/Electrical_connector last version of record as published as of the priority date of Nov. 5, 2017, as retrieved on Nov. 8, 2021. 8 pages.
Wikipedia, "USB" https://en.wikipedia.org/wiki/USB last version of record as published as of the priority date of Nov. 5, 2017, as retrieved on Nov. 8, 2021. 33 pages.
Seiko, TV Watch T001 Instruction Manual, 1982. 7 pages.
Seiko, Data 2000 Instruction Manual, 1983. 8 pages.
Asano et al., "Development of Wrist Computer System", Journal of the Horological Institute of Japan, No. 110, Sep. 25, 1984, pp. 48-72. Retrieved from "http://ci.nii.ac.jp/naid/110002776184/en" on Apr. 10, 2016. 25 pages.
Wikipedia, "Apple Watch" https://en.wikipedia.org/wiki/Apple_Watch, last version of record as published as of the priority date of Nov. 5, 2017, as retrieved on Sep. 5, 2021. 8 pages.
Wikipedia, "Wear OS" https://en.wikipedia.org/wiki/Wear_OS, last version of record as published as of the priority date of Nov. 5, 2017, as retrieved on Sep. 5, 2021. 6 pages.
Wikipedia, "Fitbit" https://en.wikipedia.org/wiki/Fitbit, last version of record as published as of the priority date of Nov. 5, 2017, as retrieved on Sep. 5, 2021. 4 pages.
Wikipedia, "Pebble (Watch)" https://en.wikipedia.org/wiki/Pebble_(watch), last version of record as published as of the priority date of Nov. 5, 2017, as retrieved on Sep. 5, 2021. 7 pages.
Wikipedia, "Project Ara" https://en.wikipedia.org/wiki/Project_Ara, as retrieved on Sep. 5, 2021. 4 pages.
Pocketcalculatorshow, "Seiko Computer Watch Fun" http://www.pocketcalculatorshow.com/nerdwatch/seiko-computer-watch-fun/, Jul. 14, 2005. 13 pages.
Wikipedia, "Timex Datalink" https://en.wikipedia.org/wiki/Timex_Datalink, as retrieved on Sep. 5, 2021. 9 pages.
Kickstarter, "Blocks—The World's First Modular Smartwatch" https://www.kickstarter.com/projects/2106691934/blocks-the-worlds-first-modular-smartwatch. Project launched: Oct. 13, 2015. 26 pages.
Kickstarter, "Neptune Pine: Smartwatch. Reinvented." https://www.kickstarter.com/projects/neptune/neptune-pine-smartwatch-reinvented. Project launched: Nov. 18, 2013. 16 pages.
Indiegogo, "Neptune Suite—One Hub, in nite Possibilities" https://www.indiegogo.com/projects/neptune-suite-one-hub-infinite-possibilities. Project launched: Mar. 31, 2015. 13 pages.
Kickstarter, "Agent: The World's Smartest Watch" https://www.kickstarter.com/projects/secretlabs/agent-the-worlds-smartest-watch/. Project launched: May 21, 2013. 14 pages.
Birming, R., "USB Memory Watch". Published by GeekAlerts at https://www.geekalerts.com/usb-memory-watch/, Aug. 4, 2007. 1 page.
Adams, A. "Montblanc e-Strap Smart Attachment for Timewalker Watch Hands-On". Published by a Blog to Watch at https://www.ablogtowatch.com/montblanc-e-strap-smart-attachment-timewalker-watch/, Mar. 3, 2015. 7 pages.

(56) References Cited

OTHER PUBLICATIONS

Purcher, J. "A Microsoft Patent Shows that a Smartwatch with Smart Band Add-On Modules is at Least on their Drawing Board". Published by Patently Apple at https://www.patentlyapple.com/patently-apple/2017/09/a-microsoft-patent-shows-that-a-smartwatch-with-smart-band-add-on-modules-is-at-least-on-their-drawing-board.html, Sep. 4, 2017. 4 pages.

* cited by examiner (a) (b)

WATCH MODULE CONNECTOR

This application claims priority to U.S. Application No. 62/581,773, titled "Module-Driven Smartwatch", filed on Nov. 5, 2017, the entire contents of which are herein incorporated by reference.

FIELD OF APPLICATION

The present disclosure relates generally to electronic devices and, more particularly, to watches and what is commonly-known as "smartwatches."

BACKGROUND

For centuries, portable time-pieces were fabricated using mechanical gears and springs; first primarily as pocket watches and later, in the late 1800s and early 1900s, as wrist-worn watches. The 1970s saw the rise of electronic, quartz-based watches which, by the 1980s, had largely supplanted mechanical watches as the primary means for personal time-keeping. The 1970s and '80s also saw the rise of personal computing with the introduction of several key systems targeted at home buyers and individuals such as the Apple II™ and the IBM™ PC. Thus, since the 1970s, there have been several attempts at creating electronic watches that would combine some form of computerized capabilities along with time-keeping in the form of a wrist-worn device. At the time of this writing, such devices are commonly-referred to as "smartwatches". For the purposes of the present disclosure, a "smartwatch" is therefore a wrist-worn device providing some form of computerized capabilities along with time.

Both classic mechanical watches and conventional quartz-based watches have traditionally been fixed-function devices with little room for extensibility. That is, once a consumer purchased a watch, the functionality they had available to them was that provided by the watch at the time of purchase and nothing more. Early smartwatches provided some extensibility in the form of rudimentary data storage and calculator-like functionality. Later, the 1990s and the early 2000s saw an increasingly wide array of computing-like capabilities being incorporated into smartwatches, including for example calendar and contact synchronization with users' computers. While some of the earlier smart-watches' computerized capabilities were exercised by way of attaching them to matching custom keyboards, such as the Seiko UC-2000 and Data-2000, later smartwatches' computerized capabilities could be tailored by attaching or connecting them to custom programming devices or actual full-fledged desktop computers, such as Epson RC-20, Seiko RC-1000, Seiko RC-4000, Seiko Ruputer, and Timex Data-link. The present-day trend for smartwatches is to enable them to be customized through pairing them to smartphones and/or corresponding cloud services.

Still, such extensibility is mostly software-based. In other words, very few marketed or proposed designs enable actual extensibility of the hardware capabilities of the watches themselves in a fully portable fashion. Even those watches that could physically connect to an outside peripheral, such as a keyboard, or a fully-fledged computer, smartphone or cloud service over wired or wireless connections could not be considered as having had their hardware capabilities extended in a meaningful fashion.

One exception to this from the early '80s is the Seiko T001 TV Watch, also known as the "James Bond Watch" featured in the "Octopussy" film part of the series. The T001 featured a series of electrical contacts for connecting a connector that was itself connected using a wire to an in-pocket receiver for receiving TV signals and sending them to the watch for being displayed. The contact points were, however, not usable for connecting any other device than the designated receiver (at least in as far as is documented), nor was it possible for the watch to obtain its extended functionality without relying on the battery-powered received to be carried by the user in their pocket constantly connected to the watch. Furthermore, the T001 manual made it clear that the watch, and therefore its extensibility, were not water-resistant. In addition, the connector was only "clicked" into place and its removal only required pushing a small tab on the top of the connector for the connector to disconnect from the watch. The connector wasn't therefore a firm and secure connector meant to withstand the sometimes harsh treatment and taxing movements that user daily activities may impose on a regular watch, such as accidentally hitting or coming in some form unintentional contact with objects, surfaces or the occasional wall or doorway; to say nothing of the movements, frictions and impacts that may occur while practicing some form of sport while wearing a watch, or the types of squeezes a watch may go through by simply putting or taking pieces of clothing off such as a sweater or coat. In short, the T001's connector wasn't designed nor sufficiently ruggedized for the typical daily wear and tear normal watches go through.

Some attempts have been made to look at providing additionally functionality, extended batteries and/or fully-fledged modular capabilities to watches and smartwatches by way of embedded functionality in wrist-bands or providing modular wrist-band parts that can be assembled into full wrist-bands attached to a watch or wrist-worn device. This includes Motorola's U.S. Pat. No. 5,872,744 entitled "Battery Arrangement for a Wrist-Carried Radiotelephone, Casio's U.S. Pat. No. 6,619,835 entitled "Body Wearable Information Processing Terminal Device", Daniel et al.'s U.S. Pat. No. 7,618,260 entitled "Wearable Modular Interface Strap", Apple's U.S. Pat. No. 8,787,006 entitled "Wrist-Worn Electronic Device and Methods Therefor", Apple's U.S. Pat. No. 9,553,625 entitled "Modular Functional Band Links for Wearable Devices", Microsoft's U.S. Pat. No. 9,668,367 entitled "Wearable Computing Systems", Duo Watches Corp's US20160066660 entitled "Multi-Watch Band", the BLOCKS modular smartwatch marketed at the time of this writing at chooseblocks.com and featured on a Kickstarter (™) campaign at https://www.kickstarter.com/projects/2106691934/blocks-the-worlds-first-modular-smartwatch, and the Qualcomm TOQ concept watch which includes a battery in its wrist-band clasp.

There are several issues with such designs. First and foremost, the user must remove the watch from their wrist to add and/or modify the attached set of modules. As such, the user can't conduct any modification "on the go" or without having to carefully plan for finding a flat surface where they can carefully remove the tiny wrist-band units and reassemble them before wearing their watch back on. Furthermore, increasing levels of integration favor grouping together similar or similarly-used components or functionalities together into single units, thereby possibly diminishing the need for simultaneously supporting several independently-linked modules. In other words, while providing hardware extensibility is desirable, it may be that most real-world scenarios don't show the need for users to have as many modules as proposed in some of these designs. Separately, by requiring users to depend on wrist-band components, those designs forfeit the user's ability to customize the look, style and possibly comfort of their watch by choosing a conventional wrist-band of their own. Watches often being a fashion article, consumers typically like to shop around for wrist-bands that match their style and/or preferences. Some prefer leather bands, others metal ones, and others still synthetic ones. Forcing users to use the wrist-band as the means for hardware extensibility therefore sacrifices this key feature of the conventional watch-wearing experience. There is also the matter that distributing weight across the wrist by adding links which each will end up weighing slightly-different weights can change how the watch behaves when the hand is moved around. In sum, the designs that rely on extending watch functionality by way of wrist-band units or wrist-band integration have several limitations which it is desirable to overcome.

Some designs illustrate a form of modularity where the watch body core is removable from a housing/case which holds to the wrist bands. This is the case of WIMM labs' U.S. Pat. No. 8,345,414 entitled "Wearable Computing Module", Aria Enterprises' "Customizable Modular Multi-Function Communication Device" and the Neptune Pine watch (https://en.wikipedia.org/wiki/Neptune Pine). These designs do no claim hardware extensibility. Instead, they focus on the reuse of the same computing functionality found in their watch's core designs for other purposes or in other circumstances than just as they are tethered to a user's wrist.

At the time of this writing the current crop of smart-watches, as they are promoted by most players in the industry, seem to be centered around the concept of providing highly-capable/integrated general-purpose smartwatches that enable software developers to tailor a smartwatch's use to provide a specific functionality to their user by way of developing a custom application that is loaded and run on the smartwatch. That is, most vendors are attempting to replicate the model popularized by smartphones where the user owns a highly-integrated device and uses different apps to accomplish different tasks on the same device. Such is the case for the smartwatches currently promoted by Apple™, as the Apple Watch™, and the different manufacturers that release smartwatches running Google's™ Android Wear™ operating system (OS).

In all those cases, the consumer is offered a self-contained, highly integrated smartwatch that combines all the electronics and the capabilities that the user could potentially need to run the software applications that are to be loaded onto his device using the application ecosystem his device belongs to, be it Apple's or Google's. Much like the smartphone ecosystems, the differentiation between such smartwatches is therefore based on the full list of technical specifications available at the time the watch is manufactured. This therefore typically means that the watch contains more hardware than the user effectively needs at any point in time since most apps tend to require only a subset of the overall capabilities of the smartwatch, and the user generally uses only a single or a very limited number of apps at most at the same time. Conversely, should new hardware features be required or introduced, or older features be upgraded, the consumer is expected to purchase a new smartwatch. Given that such smartwatches can be relatively expensive, it can be difficult for users to justify a replacement cycle similar to that found in the smartphone market, especially since, unlike smartphones, the purchase of a smartwatch is unlikely to be bundled in their carrier's customer plan.

It remains that the physical space inside a smartwatch is limited. This limits, for example, the size and therefore the capacity of a battery. Traditional coin-cell batteries that can fit in a regular quartz watch can traditionally store up to around 200 mAh. Rechargeable LiPo batteries such as those found in smartwatches can be around 200 to 300 mAh, or sometimes a bit more. In contrast, it's not uncommon to find smartphones with an order of magnitude more of battery capacity. Hence the typical approach taken at the time of this writing by smartwatch manufacturers of trying to fit many of the features found in smartphones into the much smaller smartwatch form-factor practically guarantees that the lack of battery capacity will be an irritant to users. Yet, still, equipping additional battery capacity through wrist-band integration results in the issues presented earlier.

Another issue with smartwatches is the user-interfacing limitations imposed by the limited size of their screens. Indeed, by trying to mimic an app experience similar to that of smartphones but on users' wrists, manufacturers and designers end up having to find convoluted ways to enable the user to interface with the hardware by displaying vasts amounts of information and/or app navigation interactions on a very tiny screen real-estate. Not only does the limited screen size make the navigation to the app difficult, but it also limits the possible interactions with the app itself. Indeed, apart from the predefined gestures and capabilities provided by the platform on which the app runs on and the existing buttons found on the smartwatch, an app cannot provide any other way of interacting with it to the user. Instead, since many smartwatch apps act as companion modules to smartphone apps, the smartphone app is designed to contain the full set of functionality whereas the companion smartwatch app contains only a limited subset of the overall functionality, the complete set being only available to the user when operating the app from his smartphone. The user's ability to interface with the hardware is therefore constrained by what is available on the watch as it ships from factory.

Another issue with some modern-day smartwatches is their size and weight. Indeed, given the high level of integration found in smartwatches, there are a great deal many components packaged into a single constrained housing. Furthermore, given the battery issues mentioned earlier, smartwatch rechargeable batteries must contain enough capacity to provide an acceptable experience to the user. Effectively, this means that the batteries for smartwatches containing powerful hardware must be physically large, therefore contributing to the size and weight of smartwatches. While such issues are subjective, it remains that the level of integration and battery requirements dictated by current designs create a situation where it's difficult to minimize the size without sacrificing functionality.

There is therefore a need for extending and/or modifying watches and smartwatches with additional hardware after they are manufactured.

There is therefore a need for extending and/or modifying watches and smartwatches with additional hardware without requiring the device to be removed from a user's wrist for such extension and/or modification.

There is therefore a need for enabling the addition of extended hardware interaction capabilities beyond that provided by or included in a watch or smartwatch at design time.

There is therefore also a need for enabling interaction mechanisms and/or design elements that are tailored to the form-factor limitations of and variations afforded by a wrist-worn device.

There is additionally a need for a smartwatch whose standalone weight can be optimized by reducing the quantity of components integrated within the confines of its limited housing.

There is therefore further a need for watches and smartwatches built around a hardware architecture that enables functionality replacement and extensibility.

There is therefore a need for a way for extending the hardware capabilities of watches in a way that enables such extensions to be operable in the same environment and usage constraints and conditions that normal watches are used in and subjected to.

SUMMARY OF THE INVENTION

An object of the present disclosure is to provide a watch module connector that overcomes at least one of the previously-listed drawbacks and that satisfies at least one of the above-mentioned needs.

Another object of the present disclosure is to provide a watch module connector system for connecting a self-contained module to a watch, the watch module connector system comprising:
a connector comprising:
mechanical features; and
electrical features; and
an opposite connector comprising:
mechanical features; and
electrical features; and
wherein:
the connector is connectable to the opposite connector both mechanically and electrically;
the watch includes the connector;
the module includes the opposite connector;
one of at least the connector or the opposite connector further comprises a locking mechanism;
one of at least the connector or the opposite connector further comprises a release mechanism;
the module is connectable to the watch by attaching the connector to the opposite connector;
the connecting of the module to the watch is operable using a single user hand while the watch is worn on the user's opposite wrist;
the locking mechanism locks the module to the watch upon successful connection of the module to the watch;
once connected, the module and the watch are electrically connected; and
the release mechanism is operable to unlock the module from the watch using a single user hand while the watch is worn on the user's opposite wrist.

According to the present disclosure, there is further provided a method for attaching a self-contained module to a watch using a watch module connector having mechanical and electrical features, the method comprising the steps of:
including a first connector onto the watch;
including a second connector onto the module;
configuring the module connector to be connectable to the watch connector;
configuring the module such that its connection to the watch is operable by a user with one hand while the watch is worn on the wrist corresponding to the opposite hand;
locking the module to the watch once the module is connected to it; and
providing electrical connectivity between the module and the watch contemporaneously with the locking of the module.

It is hereby noted that for brevity purposes, both the figures used in the present disclosure and the following text use the acronym "WMC" instead of of "watch module connector". All instances of "WMC" should therefore be read in context as "watch module connector". For example, "WMC waterproofing" stands for "watch module connector waterproofing". Also for brevity purposes, further references to "watch" will imply both regular wrist- and/or body-worn watches and "smartwatches", unless otherwise explicitly mentioned in the text. Furthermore, note that the use of expressions such as "current-day", "contemporary", "conventional", "traditional", "regular" or any similar term in relation to the term "watch" or "smartwatch" refers to the state of the art, the market offerings and the technologies most widely prevalent with regards to watches and smartwatches at the time of the writing of the present disclosure.

Note that the term "WMC" refers to both male and female sides and/or one or the other depending on the context, unless otherwise explicitly mentioned (i.e. "female WMC" or "male WMC"). A WMC is in fact defined by its two sides. It could also be referred to collectively as a "WMC system", either side of which would still independently be considered an instance of or implicitly imply the "full" system. Note also that this WMC system is primarily concerned with and designed for the connection of watches to modules that are self-contained. Such self-contained modules are at their most basic level an autonomous piece of electronics that includes inside of it all circuitry, peripherals and possibly batteries to operate it. Aside from the WMC system they are designed for to enable their attachment to watches, and therefore the given watch they may be attached to, most modules should likely be operable without needing to be connected to additional hardware or external power sources; several such examples are provided below. Any hardware device, or device combination, that is designed such that it requires being constantly tethered to additional hardware that is not as portable as a watch to function properly is not considered a "module" within the context of the present disclosure. This, however, does not preclude modules from being connectable to additional hardware, other than a watch, from time to time to perform specific functions, as is explained further. Such modules are still within the scope of the present disclosure.

A WMC is preferably, but not necessarily, a connecting interface enabling a watch to firmly connect to a module both electrically and mechanically. Preferably, but not necessarily, this connection is water resistant to a degree, though said degree may vary from product-to-product and based on product use cases. A WMC is typically, but not necessarily, made of two matching yet opposite ends specified to attach to each other in such a fashion that the corresponding module and watch become connected mechanically and electrically, preferably, but necessarily, in a way that resists to water or other contaminants.

The mechanical pairing provided by the WMC would preferably, but not necessarily, feature a locking mechanism to ensure attachment between the module and watch until the user releases the lock to enable module removal. The locking mechanism may or may not be automatic. If it is automatic, the module locks into place when it is properly attached to the watch. Whether the locking is automatic or not, the user is generally, though not necessarily, required to conduct a manual operation to release the lock to enable module removal. The release mechanism may, however, be automated and not require user intervention. It may, for example, be the consequence of software steps conducted by the user on the watch, in which case it's presumed the unlocking or release mechanism on the watch can be software-activated.

Most importantly, the user should be able to operate the mechanical connection between the module and the watch without having to take the device off the body part they are wearing it on. Namely, if it's worn on the wrist, the user should be able to connect and disconnect a module to and from their watch without having to take it off. If the watch is worn on the left wrist, for example, then the user should be able to attach and detach modules using just the right hand without taking the watch off their left wrist. The reverse is true if the watch is worn on the right wrist, enabling the user to operate module attachment and removal using the left hand instead. This single-hand, on-wrist operation should also apply to locking and unlocking operations, if any are provided in the WMC embodiment.

Once connected, the module and watch would be physically tied in such a way that the user should be able to go about their wearing of the combined watch and module with little to no difference in their liberty of movement from their wearing of the watch without any module. Effectively, once connected, the watch and module become a single functional unit that holds on the user's wrist or body in a way that can be abstracted by the user during most of their daily activities, much like wearing a standalone watch without a module. The module should preferably not detach accidentally due to any normal movement or accidental impact or friction it is subjected to by its wearer while attached to a watch. Instead, module detachment from a watch should be an operation requiring deliberate action by the user. This includes the operation of any connector-related locks. A watch module connector should therefore preferably, but not necessarily, be sufficiently ruggedized to enable the wearing and operating of the combined watch and module in the same environment, activities, constraints, wear and tear as a conventional watch. Such a connection or connector could also be referred or qualified as being "solid", "sturdy", "secure", "strong", or any equivalent term.

The electrical pairing enables the module and watch to interact electrically over connected connectors thereby enabling the establishment of means for transferring information and/or signals and/or power between the module and the watch. This may be done by way of using existing electrical interfacing mechanisms or techniques, such as any bus, protocol or physical interface known to be used in industry, or custom ones. The establishing of the electrical contact between the module and the watch could be used to trigger events in either the module and/or the watch. This could include powering up and/or activating components that were not previously powered and/or active on one side or the other of the connection. This electrical link would typically, but not necessarily, remain active between the module and the watch until the two are disconnected. It could be possible for the link, however, to require or permit manual steps on the user's behalf before it becomes active or to turn it off.

A specific connection and disconnection sequence may be specified for the WMC and detailed mechanical specifications may be put in place to specify the orderly establishment and tearing down of proper electrical connections between a module and a watch. It may be desirable, in the case of an electrical connection carrying a data bus for instance, for power lines to be connected first before data connectors are connected on both sides of the WMC.

The functionality provided by a module to a watch may vary greatly. The range of module applications contemplated at design time can help guide specific WMC design but WMCs should generally be designed to accommodate any type of module. For illustration purposes, it is envisioned at the time of this writing that some of the modules possible may include, but are not limited to, enabling functionalities such as providing:

incoming notifications from smartphone
  fitness tracking
  remotely-accessible storage
  music playback through either Bluetooth or an audio jack
  audio recording via a microphone
  sleep tracking
  health tracking (heartbeat, pulse oximeter, etc.)
  cellular connectivity
  camera capabilities
  gluco-meter capabilities
  bar-code or QR-code reading
  user-customizeable or user-extendable capabilities (for makers for example)

Many other functions may also be envisioned and provided as modules. Modules may also combine several functionalities together. This, therefore, could enable the creation of general-purpose modules that externalize some or much of the capabilities typically bundled inside a traditional smart-watch. In some configurations it may even be desirable for modules to be stackable, thereby enabling multiple modules to be connected together.

Modules may additionally include connectivity capabilities including, but not limited to, Bluetooth, Wifi, GSM, CDMA, GPS, NFC, RFID, IrDA, mesh networking or any other kind of radio frequency (RF)-, audio frequency-, electromagnetic spectrum-, or, more generally, wireless-enabled connectivity. Wired connectivity capabilities could also be included in modules thereby enabling a watch to connect to further forms of communication. Examples of such wired connections include, but are not limited to, general-purpose connections such as USB (with the watch being either host and/or device), Ethernet, RS232, eSATA, HDMI, DisplayPort, audio jack, or Thunderbolt, special-purpose connections such as SPI, I2C, GPIO, PWM, UART, CAN bus, or even a custom wired connection type. A watch may also include several types of connectors for attaching several types of peripherals. A watch may, for example, have slots to attach a MicroSD card or a SIM card or any other similarly-typed device.

Modules may also simply be a battery that provides sufficient power to a watch to enable or enhance its smart-watch-like capabilities. Function-specific modules may also include a battery to power the module itself and/or the watch in order to provide the functionality embodied in the module. A notification module, for instance, may comprise Bluetooth connectivity and a battery. The battery would provide the power necessary for the module to pair with the user's smartphone over Bluetooth as well as the power required for the watch to receive, display and manage notifications for the user. A module, therefore, may or may not necessarily include a battery.

Modules containing batteries would preferably, but not necessarily, be rechargeable independently of a watch. Once a Bluetooth-enabled notification module has been used for an entire day, for instance, the user may disconnect said module from their watch and place it on a charger until the following morning. The user does not necessarily need to remove their watch from their wrist to accomplish this. Instead, the watch continues to provide time while the disconnected module is getting charged. The user can then reconnect the recharged module at their convenience or choose to connect another already charged module. By having several identical modules, for instance, a user may even be able to have uninterrupted access to the functionality provided by said module by cycling through a series of fully-charged module units. This may be used, for example, to have semi-continuous access to notification capabilities without a user ever having to remove their watch for recharging. A recharged module may also serve to recharge an internal, unremovable battery or supercapacitor found inside a watch.

When a module providing a specific functionality is connected to a watch, the watch could immediately display the information related to that module's capabilities on the watch's display. If the module is for tracking fitness, for instance, then attaching it results in the watch then showing fitness tracking information from the module in addition to or instead of the current time. The user can then start interacting with the watch for the specific functionality provided by the then-just-connected module. This may mean that the user can then use the watch's buttons and/or other controls to interact with a module-specific interface and/or contextual menu and/or paradigm. In that case, the user may not have to navigate a user interface to get to the controls and/or interface associated with a connected module. Instead, they could be made readily available to the user as the module is connected.

Modules may also provide additional user-experience opportunities than those defined by or found in a watch. A module may, for instance, have additional buttons, knobs, LEDs, or even displays separate from the watch. This therefore enables module manufacturers to customize their modules' user experience capabilities without being limited by the features found in the watch at design time.

Other features of the presently disclosed computing device and method will become apparent from the following detailed description taken in conjunction with the accompanying drawings, which illustrate, by way of example, the presently disclosed electronic device and method.

BRIEF DESCRIPTION OF THE DRAWINGS

A detailed description of preferred embodiments will be given herein below with reference to the following drawings, in which like numbers refer to like elements.

Figure 27:
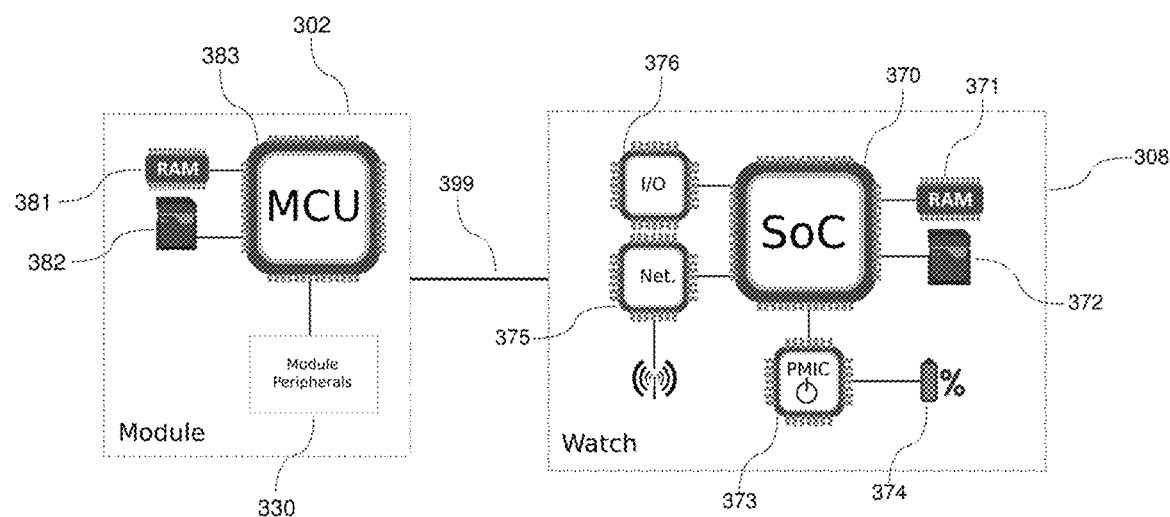
FIG. 27 illustrates the electronic connections and hardware configuration possible using a watch module connector embodiment.

Note that some elements of FIG. 27 are partially based on material provided in the public domain at openclipart.org. Note also that Trademarks belong to their respective owners. Trademarks in this document are first-letter capitalized.

DETAILED DESCRIPTION OF THE PREFERRED EMBODIMENTS

Figure 1:
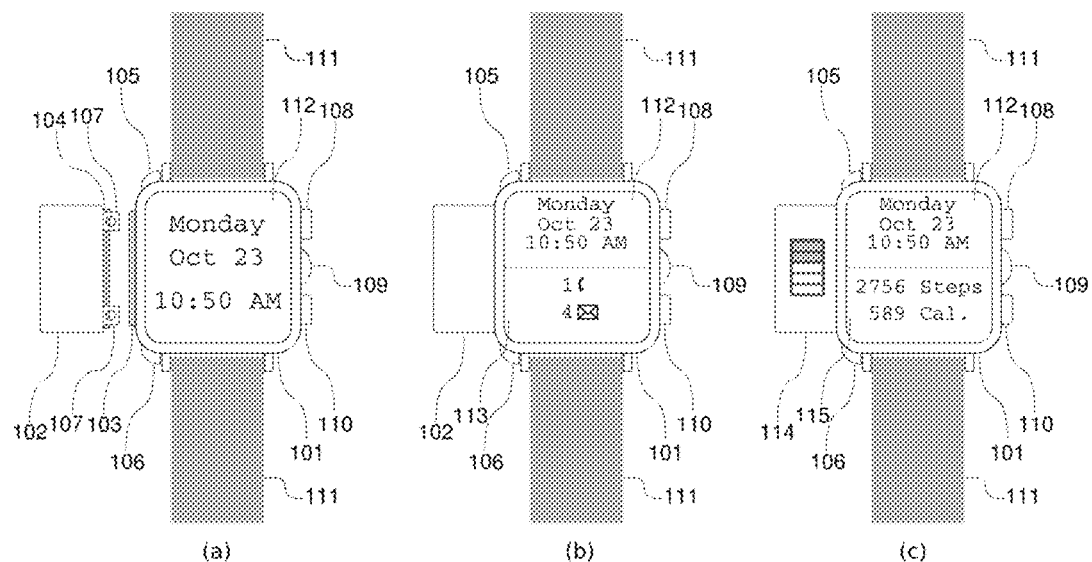
FIG. 1 illustrates an example embodiment of a watch including a watch module connector.

FIG. 1 illustrates an example embodiment of a watch 101 equipped with a WMC before (FIG. 1(a)) and after (FIGS. 1(b) and (c)) it is connected to a module 102 having a matching WMC. The WMC enables the watch 101 and the module 102 to be connected both electrically and mechanically. FIG. 1 illustrates a WMC embodiment wherein the watch's 101 WMC is made of mechanical 120, electrical 103 and sealing 121 features, while the module's 102 WMC is made of mechanical 107 and electrical 104 parts only, the sealing between both WMCs being provided by the seal 121 on the watch 101 side. Several other electrical and mechanical WMCs can be envisioned without departing from the teachings of the current disclosure. In fact, magnetic and/or capacitive and/or other types of connectors could also be used in conjunction with or in replacement of the connectors described in the present disclosure without departing from its teachings. In FIG. 1(a), the electrical connector part of the WMC 103 is shown as aligned to mate with the electrical connector part of the module's WMC 104. The size, shape and specific signals carried through these electrical connectors can change significantly without departing from the teachings of the current disclosure. Some example electrical connector sets will be presented in detail below. FIG. 1(a) also illustrates part of an example mechanical connector mechanism that can be used to connect a watch and a module. Specifically, FIG. 1(a) illustrates an example module's mechanical connector lips 107 usable to hold the module in place using spring-loaded latch pins found in the watch 101 and described later.

While FIG. 1 illustrates the connector sets as being located on the left-hand side of the watch 101, it's entirely possible for other configurations to be used. The connectors may be located on the right-hand side instead. They may also be located at the front (where the display and glass or "crystal" are typically located) or the back (which is typically the part of the watch touching the user's skin) sides of the watch 101. Modules may also be made to be connectable underneath, on the front or inside the watch 101 instead of or in addition to any of its four sides, or using a combination thereof. The specific location and/or configuration and/or the types of connectors used between modules and a watch 101 can vary significantly without departing from the teachings of the present disclosure.

Aside from the WMC, the parts of a watch 101 equipped with a WMC resemble the parts of existing watches. Namely a watch equipped with a WMC preferably, but not necessarily, has buttons 108, 110 and possibly other forms of physical user input such as thumbwheels 109 or possibly a conventional watch crown. Such a watch 101 may also optionally enable touch user input using capacitive, resistive or other such types of technologies. The watch 101 may also additionally feature gesture-based input as well as voice recognition technology. Buttons and other physical entry means may also be on the front of the watch 101 instead of on its side. The watch' display 112 is shown in FIG. 1 as being square and digital. A WMC-equipped watch 101 may however feature a round display and may also use conventional rotating watch hands to display time, whether the housing itself is square, round or of another shape entirely. The specific shape of a watch 101 and/or its display 112, and the technology used to display information on the watch 101 may vary greatly without departing from the teachings of present disclosure. The display 112 may, in fact, be a conventional LCD such as those found in 1980s digital watches. Unlike some of the previously-discussed approaches that package hardware extensions as parts of the strap holding a watch to their user's wrist, a watch that includes a WMC 101 typically, but not necessarily, uses a conventional wrist strap or band 111 to attach to a user's wrist. The watch 101 may however still rely on any other means used by any other watch in the market to attach to a user's wrist.

To connect a module 102 to a watch 101 in the case of the illustrated sample connector, the user aligns the module's connectors 104, 107 with the watch's connector 103 and starts sliding the module 102 towards the watch 101. Once the connector sets have started making physical contact, the user continues to slide the module 102 towards the watch 101 until the spring-loaded latch pins found in the watch trigger (i.e. lock onto the module's mechanical connector lips 107), thereby locking the module 102 in place. This is an operation that the user can conduct with one hand while wearing the watch on the wrist of the other hand. For instance, if the watch is worn on the left hand, the user can use their right hand to insert the module into the watch without having to remove the watch from their left wrist. To release the module 102 from the watch 101 in the case of the illustrated example connector, the user presses the release buttons (105 and 106), thereby causing the spring-loaded latch pins found in the watch to retract, thereby releasing the module 102. This too can be done with one hand while the watch is worn on the opposite arm's wrist. Springs could also be added to the watch 101 to gently push the module 102 away from the watch 101 once it is released. Other release mechanisms can be envisioned other than the buttons illustrated in FIG. 1 without departing from the teachings of the current disclosure. Instead of relying on physical buttons, for instance, release requests could also be made using the watch' user interface. Software running on the watch 101 would then instruct hardware to release the module 102 using some form of hardware-triggered mechanism. In this case as well the user can operate the removal of the module 102 without removing the watch 101 from their wrist.

Preferably, but not necessarily, once the module 102 is connected, as shown in FIG. 1(b), all connectors are hidden from view. The watch's display 112 may also change to display module-specific information. In the case of FIG. 1(b), the watch displays notification information 113 showing the number of missed calls and new emails. The rearrangement of the display 112 once a module 102 is plugged in, if any, can vary quite substantially without departing from the teachings of the present disclosure. A module 102 may also provide many other functionalities than just notifications, as outlined in the previous section. FIG. 1(c), for example, illustrates a fitness tracking module 114 attached to the watch 101. In this case, the watch's display 112 changes to display fitness tracking information 115. In addition to displaying module-specific information, a watch 101 may provide module-specific interaction functionality through its user input capabilities (including, but not limited to, 108, 109, 110) such as menus and dialogs.

Figure 2:
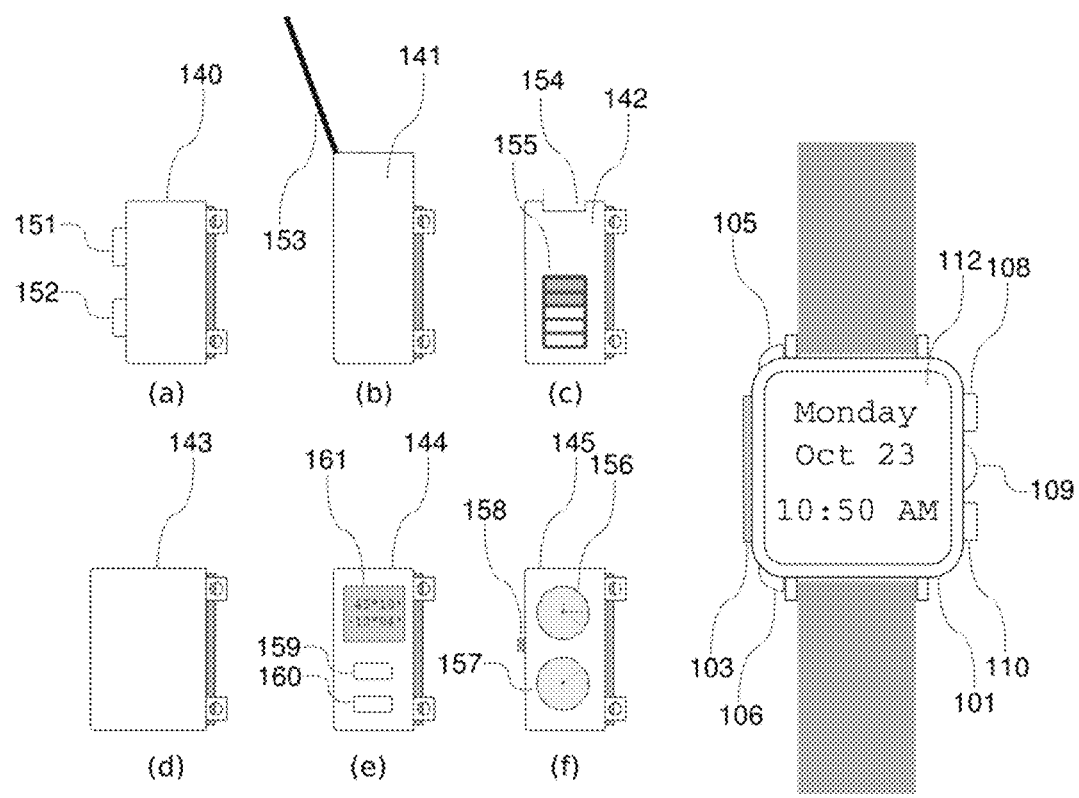
FIG. 2 illustrates several module embodiments.

FIG. 2 illustrates several example modules. FIG. 2(a) illustrates a module 140 with two buttons on its left-hand side 151, 152. Such additional buttons could be used to provide needed module-specific interaction beyond that possible through the watch' own input capabilities. FIG. 2(b) illustrates a module with a slightly-protruding height 141 equipped with a pivoting antenna 153. This may be useful for specialized radio use-cases.

FIG. 2(c) illustrates a module 142 with a connector on its topside 154 and a battery gauge 155. Such a module could be used to enable the watch to connect to a computer/PC over USB for data syncing and/or sharing in addition to using USB power to charge the module while it's connected to the watch. FIG. 2(d) illustrates a slightly-wider module 143. Such modules may be useful in case the hardware required to implement a module requires a larger printed circuit board (PCB) and/or if the module houses a larger battery. FIG. 2(e) illustrates a module 144 with an additional display 161 along with buttons on its front side 159, 160. An additional display, or other means of conveying visual information such as LEDs, could enable modules to provide a user experience tailored to the use-case addressed by the module. Front buttons could serve as another means of physical input which may be more relevant in some contexts. FIG. 2(f) illustrates a module 145 that features conventional rotating watch movements 156, 157 with one movement showing hands for hours, minutes, seconds 156 and the other showing a single rotating hand 157, possibly for chronograph use. This module 145 also features a crown 158 on its left-hand side. Other module variations can also be envisioned without departing from the teaching of the present disclosure.

Figure 3:
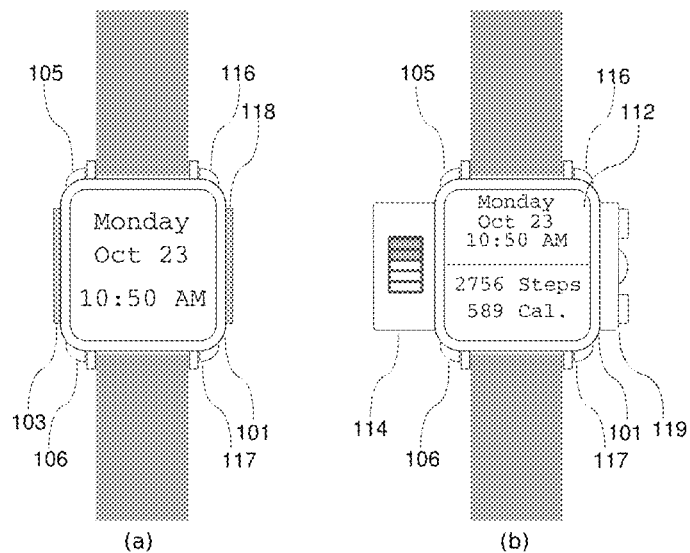
FIG. 3 is one embodiment of a watch with watch module connectors on both sides.

FIG. 3 (a) illustrates a watch 101 with WMCs on both the left 103 and right-hand side 118. Consequently, such a watch 101 would also preferably, but not necessarily, feature release buttons for the right-hand side module 116, 117. FIG. 3 (b) illustrates the previously-shown fitness tracking module 114 connected to the left connector. Additionally, it illustrates a button module 119 which replaces the built-in buttons from the previous figures. The right-hand side connector could be used to connect any module that would be connectable to the left-hand side connector, albeit the design may have to take into account that the module would be rotated by 180 degrees. A wrist watch with a WMC may be worn on either the left or right arm. As in the embodiment illustrated in FIG. 1, the insertion and removal of modules in the embodiment illustrated in FIG. 3 can be operated by the user using the opposite hand from the arm wearing the watch. As such, the user does not need to remove the watch from their wrist to attach or detach modules.

Figure 4:
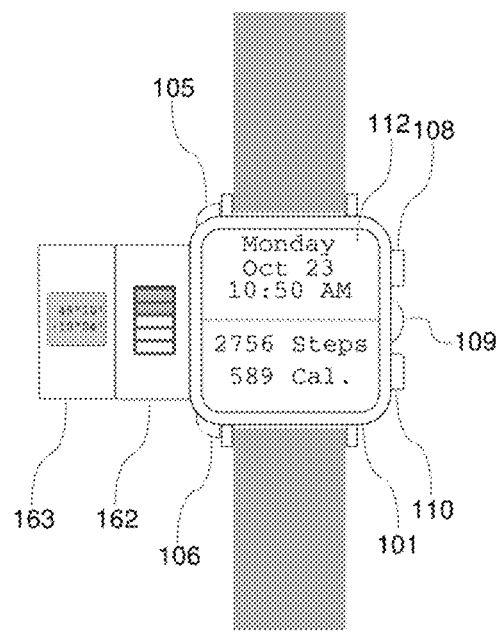
FIG. 4 illustrates a watch embodiment with stackable modules.

FIG. 4 illustrates a configuration where modules would be stackable side-by-side 163, 162. This would allow connecting several modules together simultaneously to the watch. To accommodate this possibility, modules 162 would need to have WMCs on both sides in order to enable other modules to connect to them as well. While there wouldn't necessarily be a limit to the number of modules that could be stacked, it would be for the user to determine how many modules they are willing to wear simultaneously while still finding the usability manageable. Either way, the watch would have the capabilities to allow the user to select which module's information and/or user interface is to be displayed at any point in time.

Figure 5:
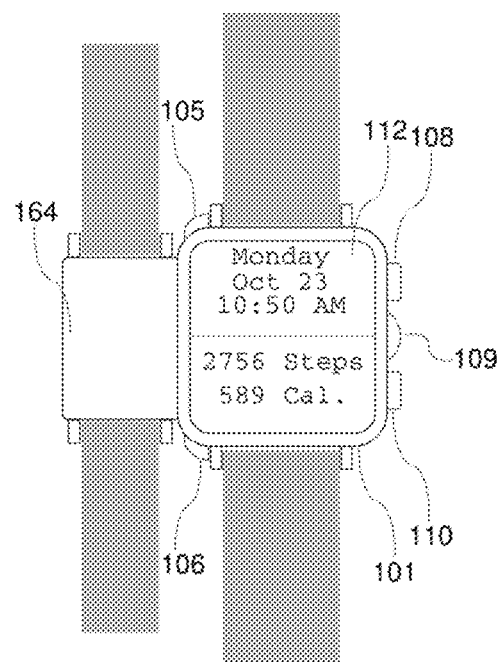
FIG. 5 illustrates a module embodiment with a strap or band.

FIG. 5 illustrates a configuration where a module 164 also has a strap or band in addition to the watch. This would provide additional support for the module either for user convenience or for design reasons. If a module is too heavy relative to the watch 101, for instance, it may be useful to hold the module in place directly. A module 164 may also be attached in some way to the watch' strap or band in some circumstances.

Figure 6:
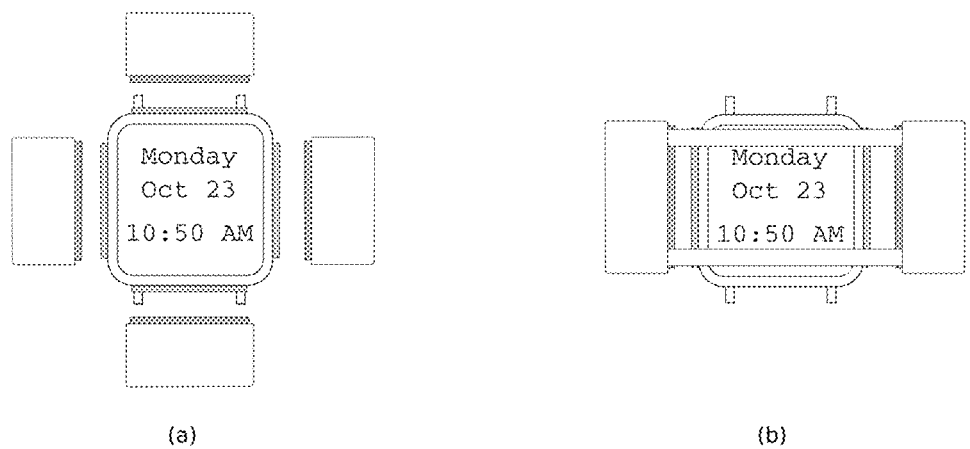
FIG. 6 illustrates example module mount locations and a module embodiment combining two sides.

FIG. 6 illustrates different possible module mounting locations and a combined module. FIG. 6(a) illustrates how WMCs may be available on all four sides of a square-shaped watch. WMCs on round watches may also be made to be available around the watch's round surface, and, possibly, feature round connectors instead of straight ones as illustrated in the present disclosure. FIG. 6(b) illustrates a combined module that spans both sides of a WMC-equipped watch. In this case, the module, or its two parts, spans across the watch. Affordances may be included in a watch's design to enable such modules that span across the watch.

Figure 7:
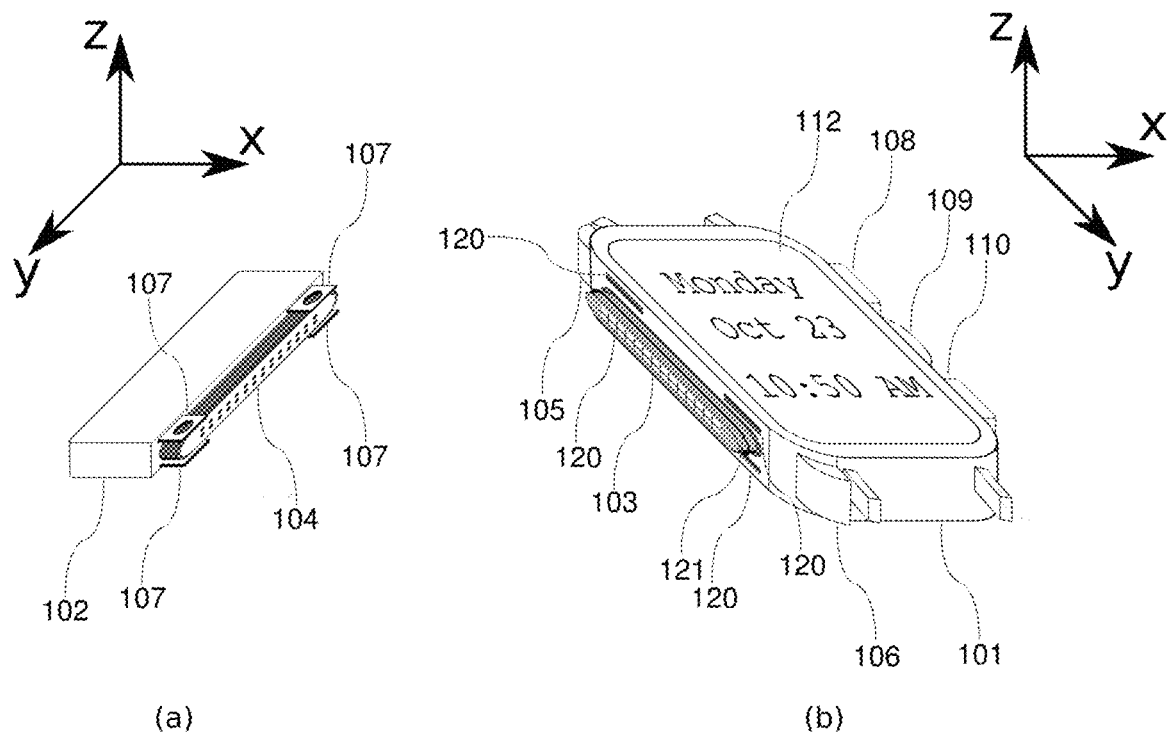
FIG. 7 is a side projection of an example watch and module.

FIG. 7 illustrates a side projection of a watch and module comprising matching WMCs. This figure provides a better view of the example connectors first shown in FIG. 1. Namely, the watch slots 120 where the module lips 107 slide in are more clearly visible. Additionally, the pins of the module's electrical connector 104 and the metal contacts in the watch' electrical connector 103 are also shown. The number of pins and metal contacts can vary in number and in configuration without departing from the teachings of the present disclosure. So too can the specific shape and location of the various connectors both in reference to the watch and the module, and in reference to each other. FIG. 7 also shows that a watch's electrical connector 103 preferably, but not necessarily, includes provision for water resistance. In this case, the electrical connector 103 is surrounded by an o-ring 121, thereby ensuring that, once the module electrical connector 104 is inserted, the electrical connection between the watch and the module is water-resistant. The example connectors illustrated on FIG. 7 are further detailed below.

Figure 8:
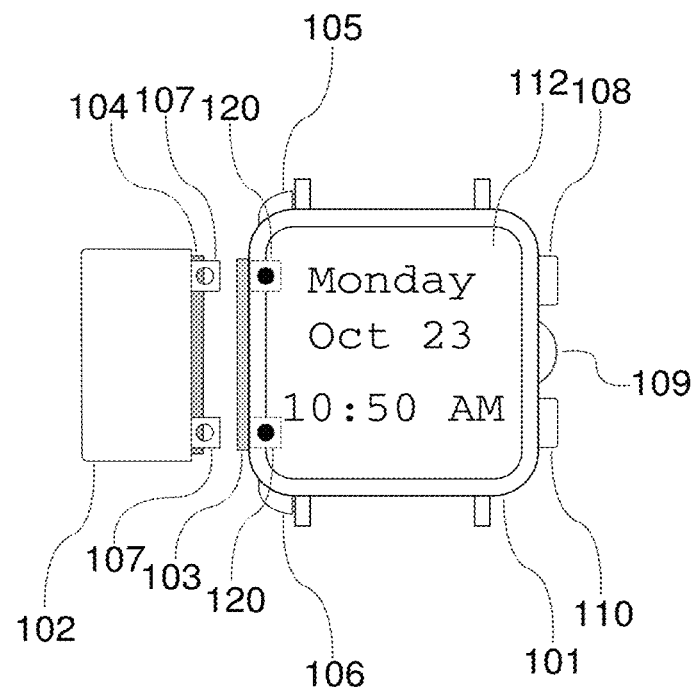
FIG. 8 illustrates an example watch showing built-in module slots.

FIG. 8 provides a top view of the example watch's built-in module slots 120 which are used to insert the module mechanical connector lips 107.

Figure 9:
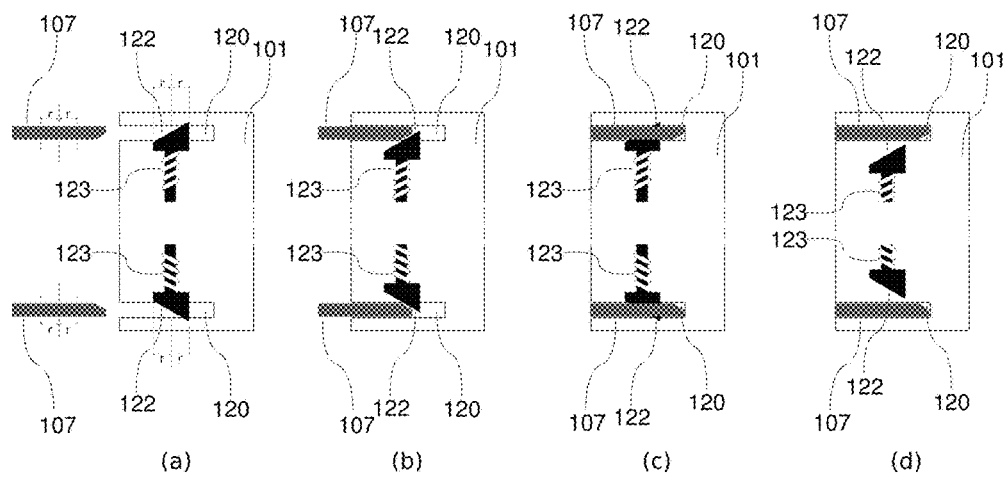
FIG. 9 is a detailed cross-section view of a latching mechanism embodiment.

FIG. 9 provides a detailed cross-section view of an example WMC latch-based locking mechanism at different stages. FIG. 9(a) shows the latching mechanism before the module 102 and the watch 101 are in contact. Note that the module 102 is not itself shown, only its mechanical connector lips 107. In addition to the watch's connector slots 120, the latch pins 122 and their corresponding springs 123 are shown. The latch springs 123 ensure that the latch pins 122 are pushed through the slots 120 at all times. To facilitate insertion, both the watch latch pins 122 and their corresponding module lips 107 are preferably, but not necessarily, beveled at matching angles. Also, the radius ("r") of the holes in the lips 107 matches the radius of the latch pins 122, with provisions being made for proper mechanical tolerances ensuring that the latch pins 122 fit with sufficient ease into the holes in the module lips 107 but while still ensuring a solid mechanical lock once inserted. As shown in FIG. 9(b), the beveled contact points ensure that when the lips 107 engage in the slots 120 and come into contact with the pins 122, the latch pins 122 compress the springs 123 and start freeing the way for the lips 107 to continue advancing in the slots 120. Once the lips 107 are inserted far enough into the slots 120, the holes in the lips 107 align with the latch pins 122 and the springs 123 cause the latch pins 122 to spring back into their original position, this time through the holes in the lips 107, thereby locking the module 102 into place against the watch 101. When any of the release buttons 105, 106, 116, 117 (not shown) are pressed, another mechanism (not shown) is used to retract the corresponding latch pin 122 as show in FIG. 9(d) thereby freeing the module lips 107 and thereby allowing the module 102 to be removed from the watch 101.

Several enhancements and variations may be made to this basic mechanism without departing from the teachings of the present disclosure. Electrical circuits and contacts may be put in place to enable the watch 101 to identify whether or not all four latch pins 122 have properly engaged through their corresponding module lips 107 thereby ensuring that the module 102 is fully secured in place. A dummy module or cover may be provided to users to ensure that the watch slots 120 and electrical connector 103 are protected at all times from debris, dust, water and/or other material that may damage the electrical connector 103 and/or obstruct the watch slots 120. Another set of springs may be included to push against the module lips 107 as they are inserted, thereby facilitating the removal of modules 102 when the release buttons (105, 106, 116, 117) are pressed by pushing the module 102 out and away from the watch 101 without user intervention.

Most importantly, the example WMC embodiment illustrated in FIGS. 1, 2, 7, 8 and 9 has several important mechanical and user-experience features. First and foremost, it can be operated using a single hand without requiring the watch 101 to be removed from a user's wrist. Indeed, a module 102 may be inserted with the right hand while a watch 101 is worn on the left hand. The user may, for instance, grab the module 102 on three sides (left, top and bottom) using their thumb, index and middle finger of one hand, align the module's WMC to that of the watch on the opposite hand's wrist and proceed to have both WMCs make contact, before continuing to insert the module until it locks in place. Removal of the module can also be a one-hand operation. The user may, for instance, press both release buttons 105, 106 by squeezing them towards each other between the right hand thumb and middle finger to release the module and continue this movement by pivoting their fingers to slide onto the then unlocked module's 102 body and push it away from the watch 101 to detach it. Such an operation would be facilitated by the presence of an additional spring mechanism that pushes against the module 102 as it's inserted into the watch 101, as this will cause the module to automatically "eject" once it's unlocked.

A second mechanical and user-experience feature of the aforementioned embodiment is that the mechanical locking mechanism can be made to be fairly sturdy with the proper choice of materials and the application of proper tolerances for the mechanical contact points. The presence of four contacts points 107, 120 close to the four corners of each of the module 102 and the watch 101 in the Y, Z plane creates a very solid anchoring against forces on any or a combination of the axes; effectively two sets of contact points, one on the Y axis and the other on the Z axis, at opposite sides of each of the watch 101 and module 102. Indeed, pulling the module 102 away from the watch 101 on the X axis will be precluded by the fact that the four module lips 107 are held inside the watch by the four latches 122 instead the watch. Twisting the module 102 by pulling it up the Z axis or any side of the Y axis will be precluded by the connected modules lips 107 and latches 122 found at the opposite side on the same axis as the twisting force's direction; for example, in the case of pulling the module up the Z axis, the lips 107 and latches 122 found near the back of the watch 101. Once attached, therefore, the module 102 will be solidly attached to the watch 101 and its attachment is unlikely to be impacted by most movements a user would typically subject a watch 101 to. Obviously, materials and tolerances need to be chosen accordingly. While this embodiment's anchoring points are fairly strong by design, a poor choice of materials is likely to cause stress points and possible damage in some cases. If a soft plastic is used, for instance, it may not resist as much as metal against some twisting or torsion movements. While the specific materials selection and tolerances criteria is outside the scope of the present disclosure, some WMC embodiments may be more resistant to abuse than others regardless of the chosen materials, tolerances or any other mechanical criteria.

A third mechanical and user-experience feature of the aforementioned embodiment is that the mechanical locking mechanism cannot be trivially activated. As illustrated in this embodiment, the release buttons 105, 106 are slightly recessed from the watch lugs and the side of the watch. As such, the user needs to simultaneously place two fingers in a very specific recessed corner of the watch to activate the release buttons 105, 106, an action that is unlikely to happen by accident during a user's daily activities. Release buttons may be designed to be further recessed, including being flush with the watch 101 body, thereby requiring the user to press "inside" into the watch body, to further preclude against accidental removal. A similar approach can be taken if the release mechanism is found in the module 102 instead of being in the watch 101. Given this and the previous feature, this WMC embodiment could therefore be qualified as "ruggedized", "solid", "sturdy", "secure", "strong", or any equivalent term. Effectively, unless the user deliberately acts to unlock a module 102, said module is unlikely to accidentally be removed from the watch 101 in the course of most daily activities users subject normal watches to.

In addition to the just mentioned features, the aforementioned WMC embodiment yet still provides a certain degree of water resistance due to the use of an o-ring 121 and electrical connectivity. Additionally, in this embodiment the module's 102 mechanical connector is a set of lips 107 whereas the watch 101 features a complex set of latches 122, springs 123 and release buttons 105, 106. This likely makes the cost of the watch 102 side WMC more expensive to manufacture than the module 101 side WMC. This may, in fact, be the preferable choice as modules, many of which may be purchased by a single user, would be less expensive to manufacture whereas the watch is likely a single, one-time purchase by the user. The aforementioned embodiment therefore has several benefits.

Figure 10:
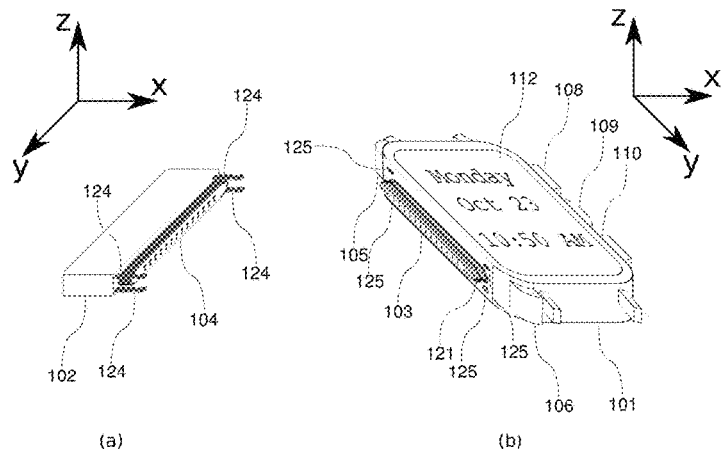
FIG. 10 illustrates an example peg-based watch module connector mechanical locking mechanism.

FIG. 10 illustrates another WMC locking mechanism based on module pegs 124 instead of module lips 107. In this case, the pegs 124 are inserted into matching watch holes 125 containing a corresponding latching mechanism that holds the pegs 124 in place once they are fully inserted into the watch 101 in a fashion similar to the previously-described mechanism.

Figure 11:
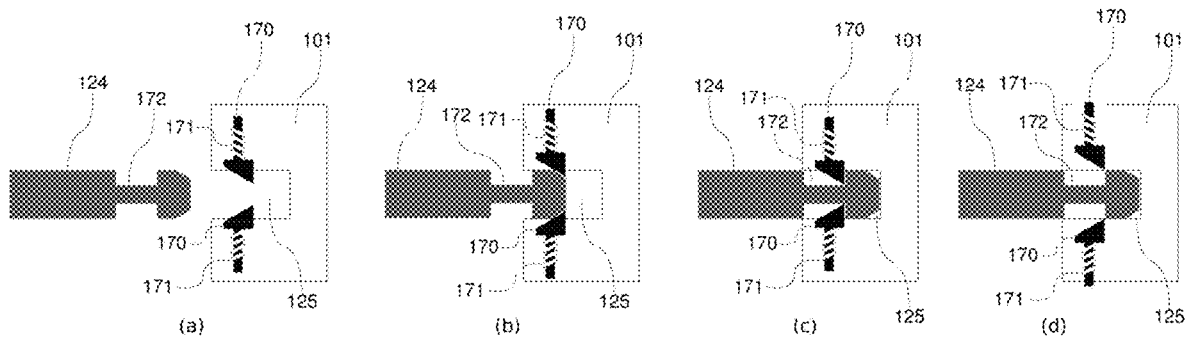
FIG. 11 is a detailed cross-section of an example peg-based alternate locking mechanism.

FIG. 11 illustrates a detailed cross-section of another example WMC locking mechanism at different stages. To operate effectively, the present mechanism requires two spring-loaded latches 170 per anchoring point instead of just one as in the previous mechanism. FIG. 11(*a*) illustrates a module's peg 124 before it's inserted into its corresponding watch hole 125. As in the previous mechanism, both the module's peg 124 and the spring-loaded latches 171 are correspondingly-beveled to facilitate insertion. FIG. 11(*b*) shows the partially-inserted peg 124 pressing on the latches 170, thereby compressing the springs 171. FIG. 11(*c*) illustrates the fully inserted peg 124 and the latches 170 that were pushed back to their original position and into the groove 172 in the peg 124, thereby locking the peg 124, and therefore the module 102, in place. FIG. 11(*d*) illustrates how the latches 170 are retracted once the corresponding release button 105, 106, 116, 117 is pressed, thereby allowing the peg 124 to be removed from the watch hole 125 and, therefore, unlocking the module 102. As in the previous locking mechanism embodiment, variations and enhancements may be made to the present mechanism without departing from the teachings of the present disclosure.

In comparison to the previous embodiment, first illustrated in FIG. 1, the embodiment of FIGS. 10 and 11 has many of the same mechanical and user experience features. Namely, it can be operated with a single hand, it has four anchoring points at the four corners of the plane where the module 102 is connected to the watch 101, and its locking mechanism is unlikely to be accidentally activated by the user. It does, however, require an additional latch 170 and spring 171 for each contact point and relies on grooved pegs 124 on the module side. Both of these likely represent additional complexity and cost when compared to the mechanism of the previous embodiment.

Figure 12:
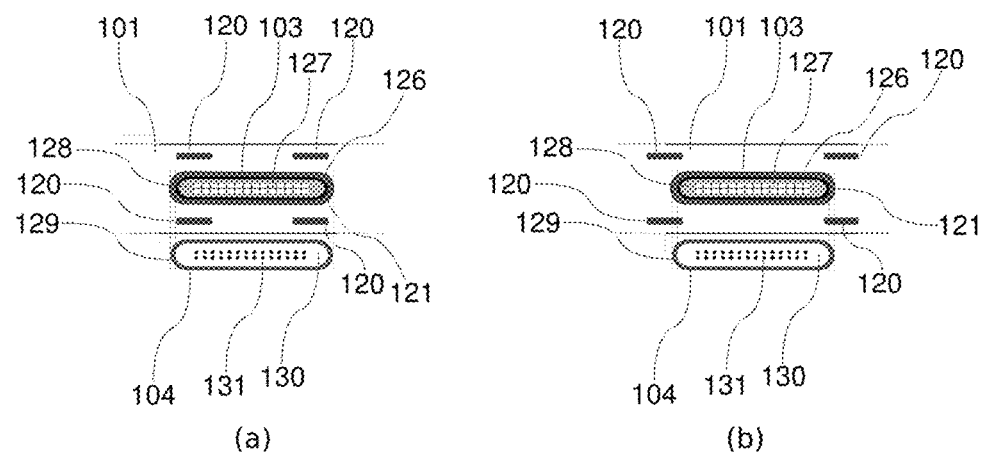
FIG. 12 illustrates a example watch module connector embodiment's electrical connectors front view.

FIG. 12 provides a frontal view of example WMC electrical connectors of both the module 102 (only the module's connector 104 is shown) and the watch 101. While the emphasis of this figure is on the electrical connectors, the watch' slots 120 are shown to illustrate their relation to the watch' electrical connector 103. Note that FIG. 12(*a*) and FIG. 12(*b*) show that the slots' 120 position can change in relation to the electrical connector 103 if required. Such may be the case to accommodate a mechanical latching mechanism such as one of those described earlier.

The watch electrical connector 103 in this illustration is preferably, but not necessarily, made up of a recessed space 126 for fitting a corresponding module connector shield 129, a protruding solid tongue 128 in front of which are found the metal contacts 127 against which the module connector's pins 131 connect, and an o-ring 126 surrounding the connector tongue 128. When the module connector 104 is inserted into the watch' connector 103, the connector shield 129 fits into the recessed space 126 and squeezes against the o-ring 121 thereby ensuring a water-proof seal of the electrical connections between the watch connector's metal contacts 127 and the module connector's pins 131. The module connector 104 itself has a recessed space 130 for the watch connector's tongue 128 to fit into as the connectors are inserted into one another. The watch connector 103 may additionally have a single or several metal contact points (not shown) for the connector shield 129 to come into contact with in order to put the watch' and the module's grounds in common. Another o-ring (not shown) may be used at the base of the shield 129 in addition to or in replacement of the initial o-ring 121 to seal the shield's 129 contact with the watch connector 103.

Both the example watch electrical connector's 103 (male side) and the example module electrical connector's 104 (female side) parts have correspondingly round shapes at both ends in order to ensure a proper o-ring 126 seal since o-rings require round shapes to provide a proper seal. FIG. 12 shows the connectors to have 28 contact points for illustration purposes. Any number of contact points, including only a handful, can be used instead of the 28-pin-based connectors shown and other shapes and connection specifications could be used instead of those presented without departing from the teachings of the present disclosure. It may, in fact, be beneficial to use existing buses and connectors such as those provided by the USB specifications to facilitate the development of both the watch and modules. For instance, it would be possible to create a custom connector that relies partly, or even entirely, on USB signals between the module and the watch in a water-proof configuration. Water-proofing is important in the case of the connection between the watch and the module given that the module will be worn on the wrist and could be subjected to the user's own human sweat and/or contact with water as the user goes about their daily activities and/or routines. That's especially true in the case of some modules whose specific purpose may be fitness tracking or providing diving computer capabilities.

Figure 13:
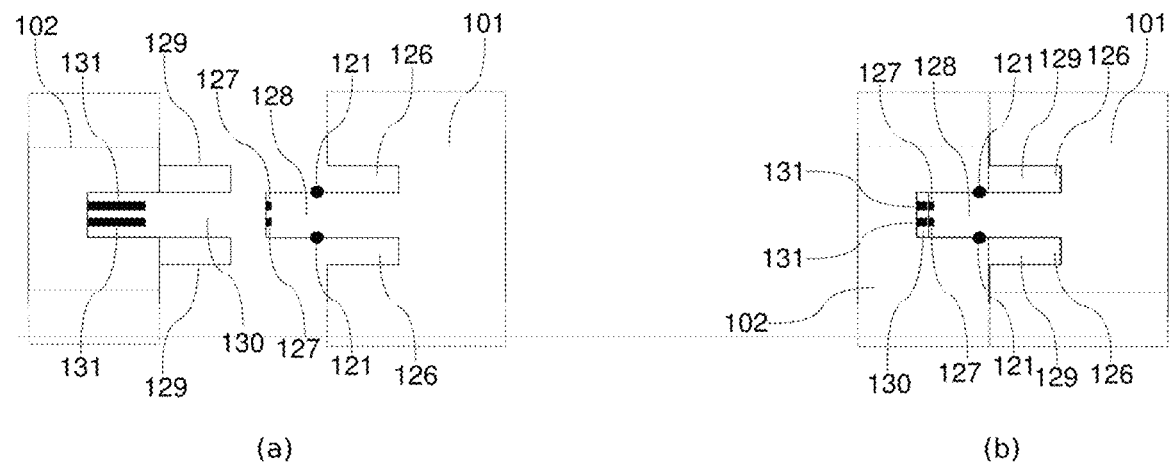
FIG. 13 illustrates an example electrical connectors cross-section.
Figure 14:
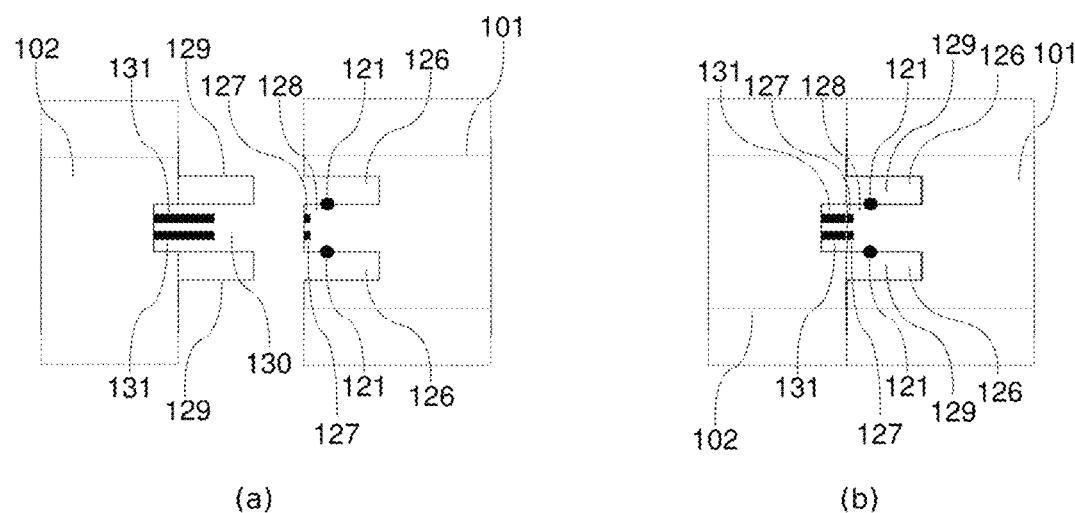
FIG. 14 illustrates an alternate example electrical connectors cross-section.

FIG. 13 illustrates a cross-section of example electrical connectors from both the example module 102 and watch 101. FIG. 13(a) illustrates the connectors before they are connected and FIG. 13(b) illustrates the connectors once they are connected. The watch connector recessed space 126 is shown as providing enough space for the module connector shield 129 to fit inside it. The watch connector tongue 128 is shown as protruding slightly from the side of the watch 101. This is to permit easy replacement of the o-ring 121 by the user. FIG. 14 shows a configuration where the tongue 128 is practically flush with the watch' 101 body. The o-ring 121 in that configuration is harder to service as it is hidden inside the watch' connector recessed space 126. Either way, the o-ring 121 surrounding the tongue 128 finds itself compressed between the tongue 128 and the module connector shield 129 once the tongue 128 is fitted into the module connector recessed space 130 and the module connector shield 129 is fitted into the watch connector recessed space 126. The example module connector pins 131 are spring-loaded and can effectively be seen as what is typically-called "pogo-pins". Hence, once the metal connectors 127 come into contact with the module connector pins 131, the pins 131 start retracting and remain in some compressed form once the connectors are attached together as seen in FIG. 13(b). By using some form of spring-loaded pins, the module's pins 131 and the watch connector's metal contacts 127 continue pushing against each other, and therefore remain connected, as long as the module 102 is connected to the watch 101.

Several changes and enhancements may be made to the connectors presented without departing from the teachings of the present disclosure. The spring-loaded pins may in fact be in the watch' connector instead of the module's, and the metal contacts in the module's connector instead of the watch's. Instead of using spring-loaded pins and metal contacts, for instance, other electrical mating connector types may be used, possibly inspired by or derived from existing connectors such as USB, D-subminiature, registered jack, DIN, slot/edge, headphone jack, or any other connector technology on the market. Additionally, any of the mechanical locking mechanism presented in the present disclosure may be integrated and/or combined to the electrical connectors.

Once electrically-connected using a WMC, a watch and a module may use any number of techniques, protocols and/or signals to communicate together. Bus types, for example, may include, but are not limited to, USB, I2C, SPI, UART, PCI, SDIO, any common bus used in industry to connect hardware blocks or a custom bus. Signals may be transmitted as differential signaling or singled-ended signaling or both. They may also either be analog or digital. Provisions may further be provided for connector specifically tailored for carrying RF signals. Alternatively, it's entirely possible that instead of or in addition to electrical connectors that optical connectors may be used. Effectively, the "electrical" component of the WMC should be considered to include any means of transferring signals an/or data between a module and a watch equipped with corresponding WMCs.

Figure 15:
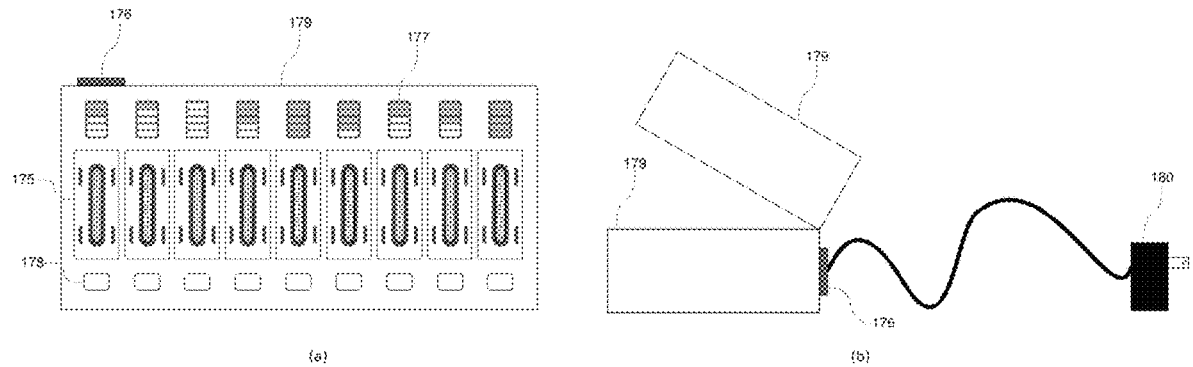
FIG. 15 illustrates a module charging station box.

FIG. 15 illustrates a module-charging station 179 as a flip-cover box. FIG. 15(a) shows a top-view of the charging station 179 with slots 175 for holding 9 individual modules. Each slot 175 has connectors similar to those found in the example watch illustrated in FIG. 1 and allows connecting a module for recharging. A battery gauge 177 above each WMC 175 enables the user to know the charging state of each module. A release button 178 at the bottom of the connector enables the user to release the module at any time. FIG. 15(b) shows a side-view of the box 179 with its flip-cover along with the wall adapter 180 used to connect the box 179 for recharging to an electrical outlet. The wall adapter 180 may be connected to the box 179 through a power connector 176 at the back of the box 179. The box 179 may double as a carrying case or travel accessory for carrying modules around by the user. The specific mechanical form-factor, number of slots, and type of connection to an electrical outlet may vary greatly without departing from the teachings of the present disclosure. The recharging station 179 may, for instance, itself have a battery allowing it to be recharged independently and later charging modules on-the-go.

Figure 16:
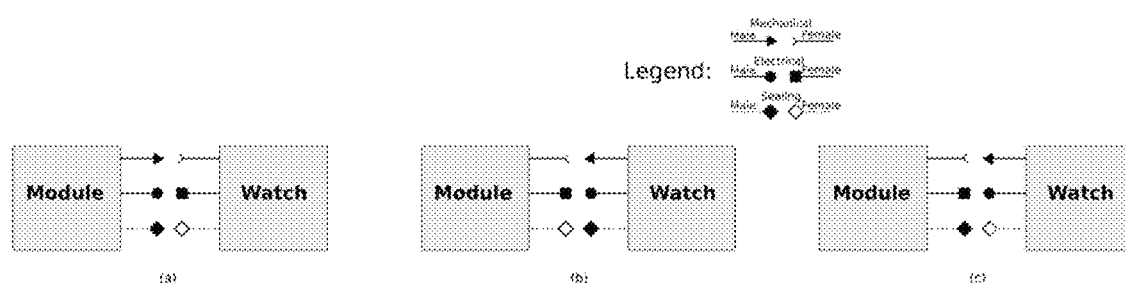
FIG. 16 illustrates the overall watch module connector operating principle.

FIG. 16 illustrates the overall operating principle behind a WMC. Effectively, a WMC provides mechanical and electrical connection (alternatively a "connector" or "connectors") between a module and a watch and may, optionally, also provide sealing capabilities (alternatively a "seal") to ensure the electrical and, possibly also the mechanical, connections between a module and a watch remain isolated from contaminants such as water, dirt, sweat, etc. For each connection type, there is a male and a female end. Each mechanical male part and/or feature has a matching corresponding female one. Each electrical male part and/or feature has a matching corresponding female one. Each sealing part, such as an o'ring, and/or feature has a matching corresponding female one. The number and configuration of male/female pairs may vary greatly without departing from the teachings of the present disclosure. The male sides may all be on the same side as illustrated in FIG. 16(a), or the male/female ends may be on opposite sides as illustrated in FIGS. 16(b) and (c). This applies to locking mechanisms as well, if any are present.

Figure 17:
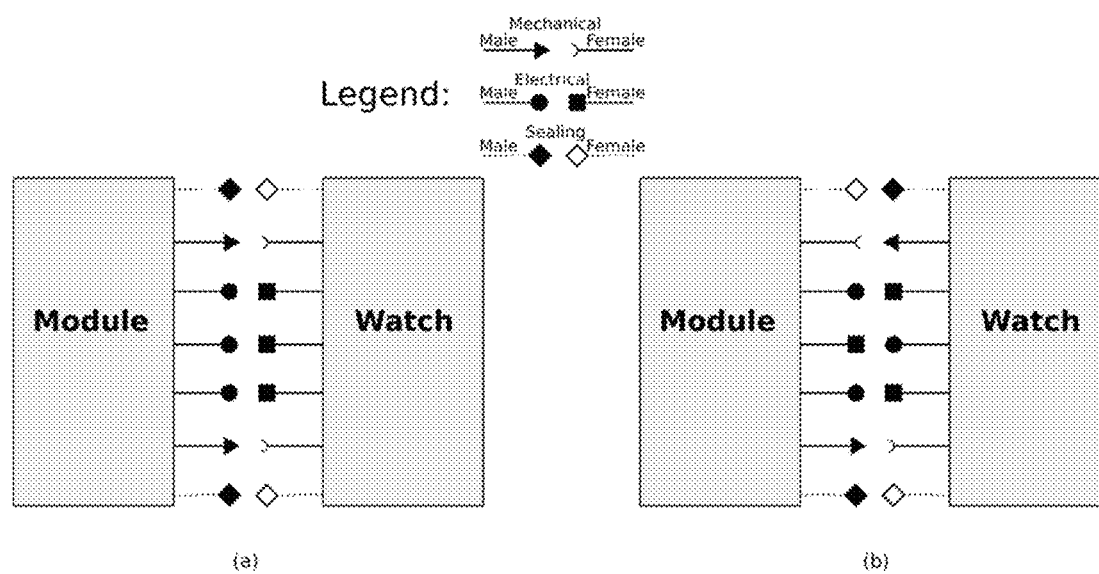
FIG. 17 illustrates an expanded view of the watch module connector operating principles.

FIG. 17 illustrates two examples ((a) and (b)) of the WMC operating principles in practice where there may be several contacts, parts and/or features of each type, sometimes asymmetrically. In FIG. 17(a), for instance, all male and female combinations for each type of connector and/or feature are on the same side, whereas in FIG. 17(b), they are mixed. Nothing, for example, precludes a module from having both a male and female electrical connector matching corresponding female and male connectors on the watch. Nor does anything preclude having an unequal number of each type of connector. There may be two or four anchoring points while there may be a dozen ore more electrical connectors and a single o-ring. The previous permutations apply to locks or locking mechanisms as well, if any are present.

Any of "mechanical", "electrical" or "sealing" type of connector may be made of a single or several features, parts, materials, mechanisms and any other aspect used to specify a connector. A single connector may have several roles simultaneously. A connector used to mechanically connect and lock a module to a watch, for instance, may also simultaneously be used to provide common electrical ground connection between both devices. A primarily electrical connector, such as the one detailed in FIG. 12 and FIG. 13 may also serve as mechanical support for ensuring a sealing connector, an o-ring in this case, is properly positioned once a module and a watch are connected. The shape, size and features of any specific connector may not be tied to the other connectors of the same type or other types. There may, for instance, be some electrical connectors that are larger than others. There may also be a combination of several mechanical connectors or mechanisms used simultaneously for any given WMC.

Additionally, connectors of any given type may be made using a variety of technologies, including some that do not require direct physical contact. Mechanical connectors and locks may be magnetic, for example, while electrical contacts may be capacitive or inductive. Elecromechanical components and/or tiny motors may also be used where relevant for a given WMC embodiment.

Figure 18:
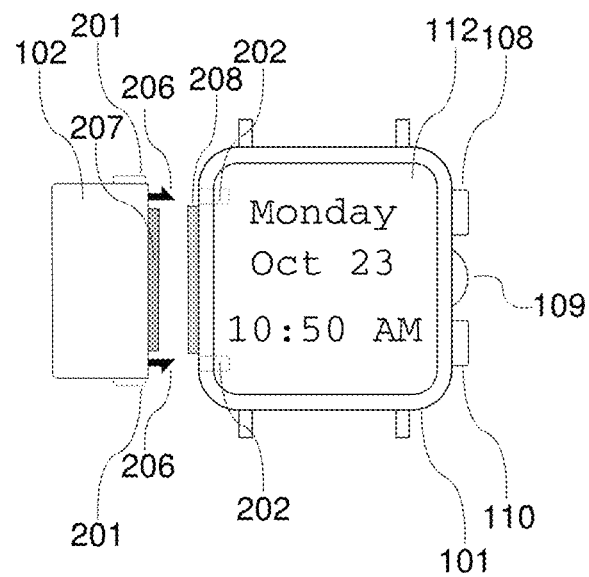
FIG. 18 illustrates a double-latch watch module connector embodiment.

FIG. 18 illustrates a WMC featuring double-latches 206 mounted on the module 102 side. In this case, spring-loaded latches 206 protrude from the module's 102 side. When the module 102 is pressed against the watch 101 in this embodiment, the spring-loaded latches 206 engage into matching recessed spaces 202 inside the watch 102. The recessed spaces 202 are positioned as to force the latches 206 to contract closer together towards the middle of the module. The recessed spaces 202 feature a latch-tip-shaped area (not shown in FIG. 18 but visible in FIG. 19) further in each recessed space 202 where the spring-loaded latches 206 can return to their normal position once they are sufficiently inserted into the watch 101 and therefore lock the module 102 into place. The module 102 in this embodiment further comprises a button 201 matching each latch 206. By pressing the buttons 201, the user contracts the latches 206 inwards and enables their release of the latch-tip-shaped portion of the recessed space 202, thereby enabling the module 102 to be removed from the watch 101. In this embodiment, the electrical connectors 207, 208 may be based on any of those covered earlier for other embodiments or an industry standard connector or even a custom one. The same applies to any possible seal, such as an o-ring.

As in previous embodiments, the embodiment illustrated in FIG. 18 allows the user to insert and remove modules 102 using the opposite hand from the arm wearing the watch. Inserting the module 102 in the present embodiment can be done using the right hand while the watch 101 continues to be worn on the left hand. Removing the module 102 is done by simultaneously pressing on both release buttons 206 using, for example, the opposite hand's thumb on one button and index on the other button and pulling the module 102 away from the watch 101.

Figure 19:
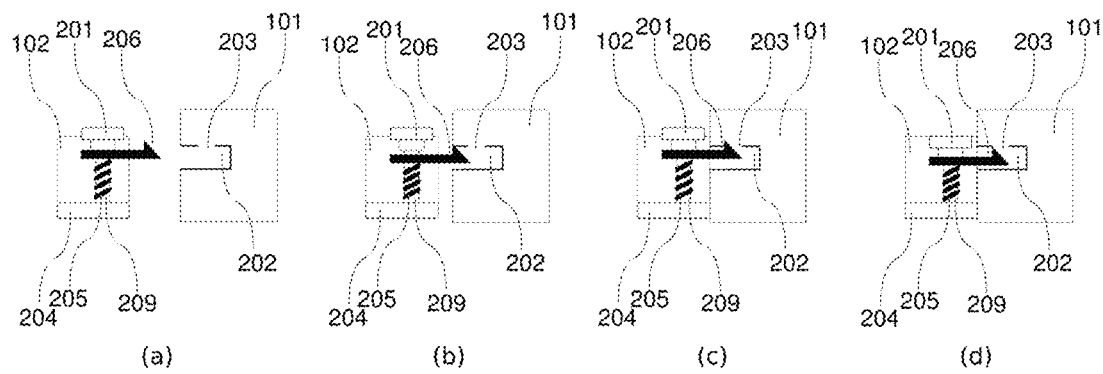
FIG. 19 illustrates a detailed view of a double-latch watch module connector embodiment.

FIG. 19 provides a detailed view of the cross-section of the mechanical connector illustrated in FIG. 18. FIG. 19(a) illustrates the module 102 before it is in contact with the watch's 101 body. The latch mechanism in the module 102 includes a release button 201 that extends into the body of the module 102 as a rod 209 passing through the latch 206 and fitting in the spring stopper 204. A spring 205 is fitted onto the button's 201 rod 209 and compressed between the latch 206 and the spring stopper 204. FIG. 19(b) illustrates the module 102 as it aligns with the watch 102 and the latch 206 enters in contact with the recessed space 202. The latch's 206 beveled tip forces it to move down the rod 209 and compress the spring 205. FIG. 19(c) illustrates the moment where the module 102 is sufficiently inserted into the watch 102 that the latch's 206 tip clears the latch-tip-shaped area 203 in the recessed space 202 and therefore is forced back into its original position by the spring 209, thereby locking the module 102 into place. FIG. 19(d) illustrates the case where the user presses on the button 201, causing the latch's 206 tip to exit the latch-tip-shaped area 203 and thereby unlocking the module 102 and enabling its removal from the watch 101.

In comparison to the previous embodiments, namely those first shown in FIGS. 1 and 10, the embodiment of FIGS. 18 and 19 has different mechanical and user experience features. While it does feature one-hand operation and non-trivial lock operation, its locking mechanism only provides two main contact points instead of four as in the previous designs. Indeed, there are only two latches 206, one on each side of the module 102 along the Y axis. Unless quality materials and sufficiently tight tolerances are used for the latches 206 and corresponding recessed space 202 are used, this design may not thefore fare as well as the previous ones against forces along the Z axis. Still, the benefit is that there are only two latches instead of four as in the previous designs.

Figure 20:
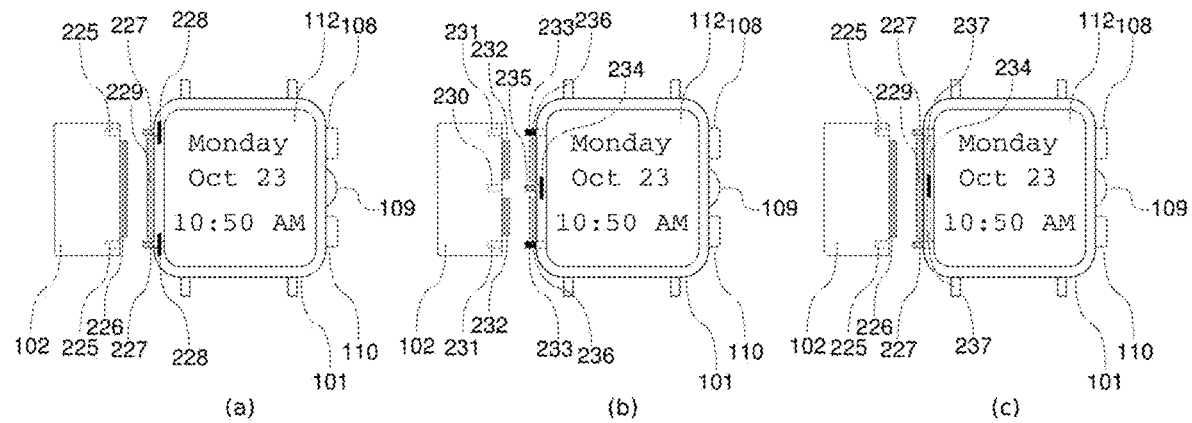
FIG. 20 illustrates a screw-based watch module connector embodiment.

FIG. 20 illustrates another set of WMC embodiments wherein the watch 101 and module 102 are attached using screw-based mechanisms. FIG. 20(a) illustrates a WMC embodiment wherein the watch 102 comprises two threaded pins 227 operated using individual rotating wheels 228 and wherein the module 102 comprises two matching threaded holes 225. To attach the module 102 to the watch 101, the user could align the module's 102 connector 226 against the watch's 101 connector 229 and keep the module in place by pushing on the left side of the module 102 with the index and middle finger while rotating the wheels 228 with the thumb to attach the module 102. By rotating the wheels 228, the threaded pins 227 screw into the matching threaded holes 225, thereby securing the module 102 to the watch 101. To remove the module 102 from the watch 101, the user rotates the wheels 228 in the opposite direction, thereby causing the threaded pins 227 to exit the threaded holes 225 and therefore releasing the module 102 from the watch.

FIG. 20(b) illustrates another screw-based WMC embodiment. In contrast to the embodiment illustrated in FIG. 20(a), the embodiment in FIG. 20(b) comprises a single threaded pin 235 instead of two 227, a single corresponding rotating wheel 234 instead of two 228, two unthreaded guide pins 233, two unthreaded guide holes 231 and split connectors 232, 236. In this case, the user need only operate single rotating wheel 234 instead of two to lock the module 102 against the watch 101, the watch's 101 guide pins 233 serving to help keeping the module 102 from rotating while the threaded pin 231 is being screwed into the threaded hole 230. In this embodiment, the electrical connectors 232, 236 are split in two parts to enable having the threaded pin 235 and mating threaded hole 230 to be located in the middle of the contact surface between the module 102 and the watch 101.

FIG. 20(c) illustrates yet another screw-based embodiment. Like the embodiment illustrated in FIG. 20(a), it features two threaded pins 227 and two matching threaded holes 225. In this case, however, there's only a single rotating wheel 234 that operates both threaded pins 237 using a series of gears and mechanisms 237. This embodiments has the benefit of the previous embodiment without the possible inconvenience of a split connector.

Several variations and improvements are possible on this screw-based WMC approach without departing from the teachings of the present disclosure. For instance, while the embodiments illustrated in FIG. 20 feature the rotating wheels 228, 234 and corresponding screws 227, 235 as located in the watch 101, those could be in the module 102 instead and the corresponding threaded holes could be in the watch instead 225, 230. The connectors could also be on the front (where the watch display and glass are typically found) of the watch instead of being on the side and another screw-based mechanism could be devised wherein the rotation of a wheel causes the threaded pins in a module to screw down into the watch body.

In comparison to the previous embodiments, this embodiment most closely resembles the one first presented in FIG. 18 with regards to its mechanical and user experience features. Indeed, its contact points are mainly along the Y axis. Furthermore, the need for the user to operate a rotating wheel for both insertion and removal instead of release buttons is a bit more inconvenient.

Figure 21:
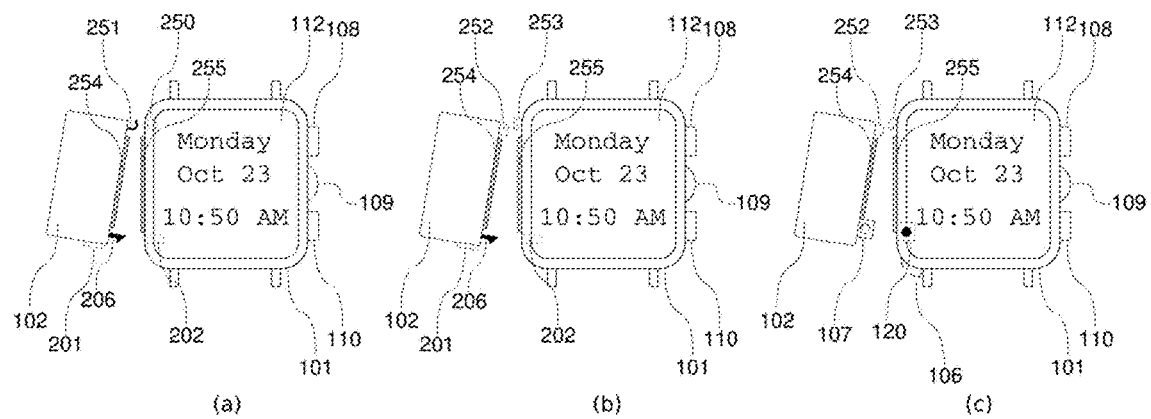
FIG. 21 illustrates a pivoting-hook-based watch-module connector.

FIG. 21 illustrates a series of embodiments wherein the operation of the mechanical link between a module and a watch revolves around the use of a pivot for hooking the module to a watch and then rotating the hooked module to lock into the watch. FIG. 21(a) illustrates an embodiment wherein the module 102 includes a hook 251 that attaches to a pivot 250 inside the watch's 101 body. The module 102 in this case is inserted at an angle on the left hand side. Once the hook 251 latches onto the pivot 250, the module 102 can be rotated around the Z axis (the Z axis being perpendicular to the diagram's page's plane and parallel to the line of sight between the eyes of a user looking straight at the watch's display) centered at the pivot 250 to enable the locking of a latch 206 into a recessed space 202 in the watch 101. This locking mechanism is similar to the one presented in FIG. 18 and FIG. 19, and also relies on the use of a release button 201 for unlocking the module 102 and enabling its release. Contrary to that previous embodiment, however, there is only a single button 201 required for releasing the module 102. FIG. 21(b) illustrates an embodiment similar to that of FIG. 21(a), except that the initial engagement of the module 102 with the watch 101 is done by way of a square-shaped hooks 252, 253 instead of the round-shaped hook 251 and pivot 250 of the previous embodiment. Note that the module's 102 square-shaped hook 252 may be made to engage with an equivalently-shaped recessed space inside the watch 101 instead of an external square-shaped hook 253 as illustrated in FIG. 20(b). FIG. 21(c) illustrates a further embodiment akin the one in FIG. 21(b), with the exception that the locking mechanism used is the one detailed FIGS. 7, 8 and 9.

Figure 22:
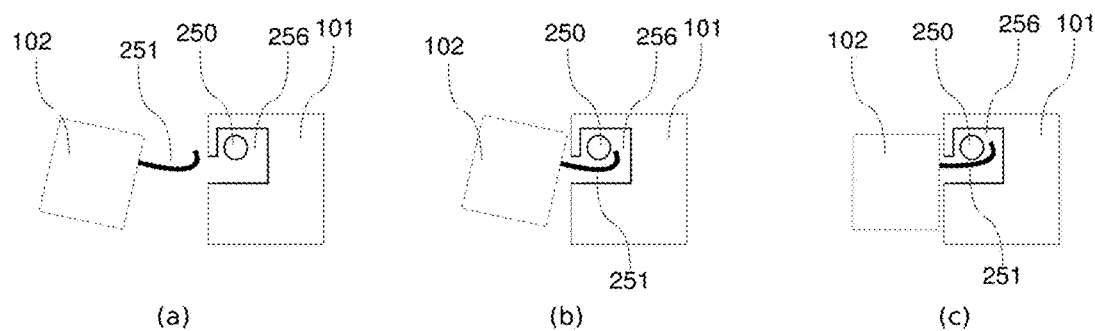
FIG. 22 details the operation of a round pivoting-hook-based watch module connector embodiment.

FIG. 22 illustrates a detailed view of the cross-section of the mechanical connector featured in the embodiment illustrated in FIG. 21(a). FIG. 22(a) illustrates the module 102 hook 251 before it engages in the recessed space 256 inside the watch 101 holding the pivot 250. FIG. 22(b) illustrates the module 102 being inserted at angle to permit the hook 251 to pass the pivot 250 inside the recessed space 256. FIG. 22(c) illustrates the module 102 being rotated in position thereby locking the hook 251 onto the pivot 250. To free the hook 251 from the pivot 250, the module 102 is rotated once more towards the same angle that was used to get the hook 251 to properly enter the 256 and clear the hook 250.

Figure 23:
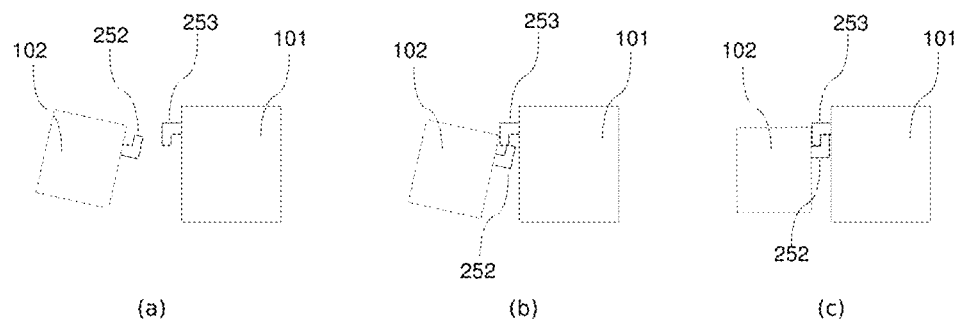
FIG. 23 details the operation of a square pivoting-hook-based watch module connector embodiment.

FIG. 23 illustrates a detailed view of the cross-section of the mechanical connector featured in the embodiment illustrated in FIGS. 21(b) and (c). As in the embodiment detailed in FIG. 22, FIGS. 23(a), (b) and (c) illustrate the sequence of alignment, hooking and rotation using the square-shaped hooks 252, 253 instead of the hook 251 and pivot 250 of FIG. 22.

Note that while FIGS. 21, 22, and 23 illustrate embodiments that revolve around the use of rotation around the Z axis (which, as was described earlier, is perpendicular to the page showing the illustrations of those figures), similar embodiments can be designed wherein the rotation occurs around the X or Y axes instead (both axes being coplanar to the page on which the illustrations of those figures are printed or displayed on.) In such cases, the hooks or pivots could be on or near one of the corners of the front of the watch and one of the sides (top, bottom, left or right in the case of square watch or anywhere around a circular or otherwise-shaped watch), and the lock would be on the opposite side of the plane that is perpendicular to the axis of rotation and parallel to the relative surface where a module would come in contact with the watch upon full rotation, much like in the embodiments in FIG. 21.

In comparison to the previous embodiments, this embodiment also resembles the one first presented in FIG. 18 with regards to its mechanical and user experience features. Here too, the contact points are mainly along the Y axis. Given the rotation movement, however, there's only the need for one release button and, correspondingly, half the latches required in comparison to some of the previous designs. This may have cost and usability benefits.

Figure 24:
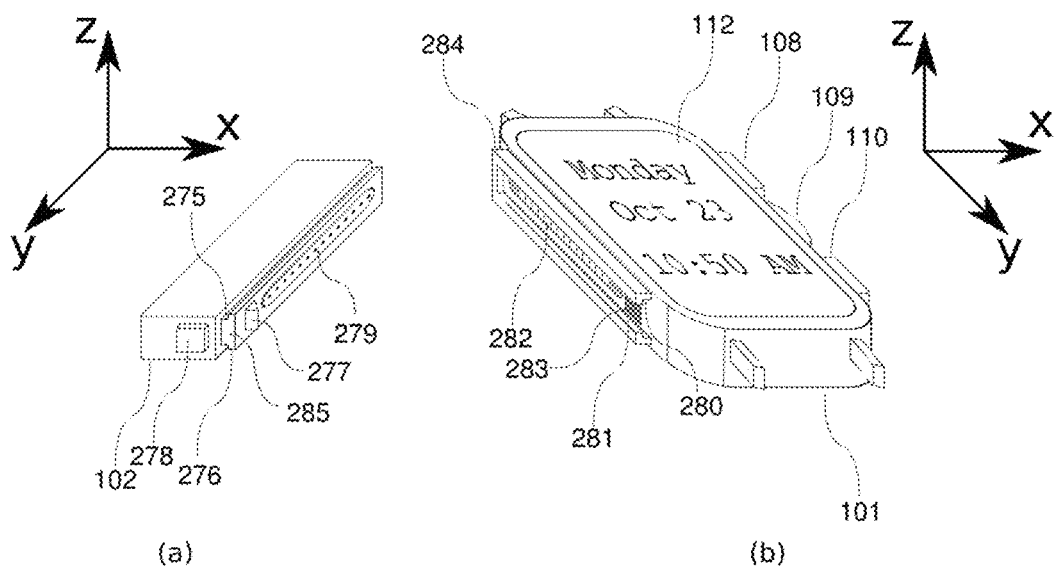
FIG. 24 illustrates a horizontal slide-in watch module connector.

FIG. 24 illustrates another embodiment of a WMC wherein the module 102 features a "T-shaped" protruding connector 285 (or "T connector" for short) that slides into a corresponding "T-shaped" slot 284 (or "T slot" for short) on one of the watch's sides along the Y axis; for reference, the axes illustrated in FIG. 24 conform the descriptions and definitions provided for those same axes earlier and vice-versa. The T connector 285 features a groove 275 and a ledge 276 that match the T slot's 284 ledge 280 and groove 281. The T connector 285 also features electrical contacts 279 that align with the watch's 101 electrical contacts 282 found inside the T slot 284. The module's 102 electrical contacts 279 may be spring-loaded, such as what is commonly-referred to as "pogo pins", or it could be the watch's 101 electrical contacts 282 that may be spring-loaded. Other electrical contact technologies based on existing or new designs may be employed as well.

To connect the module 102 to the watch 101, the T connector's 285 ledge 276 is fitted into the T slot's 284 groove 280. As such, the T connector 285 slides into the T slot 284. Once the T connector 285 is sufficiently inserted into the T slot 284, a spring-loaded and bevel-tipped latch 277 makes contact with the watch's 101 body and starts retracting into the module. Once the T connector 285 is further inserted into the T slot 284 and the latch 277 clears the recessed space 283, the latch 277 automatically returns to its original position and therefore locks the module 102 into place. At that point, the module's 102 electrical contacts 279 are aligned with the corresponding electrical contacts 282 from the watch 101 and any electrical interfacing between the module 102 and the watch 101 may begin. Having one of the module's 102 electrical contacts 279 or the watch's 101 electrical contacts 282 being spring-loaded would ensure that electrical contacts on both sides (279 and 282) would remain in contact throughout the mating of the module 102 to the watch 101. To remove the module 102, the user presses on the release button 278, thereby causing the latch 277 to retract fully into the module 102 and thereby enabling the T connector 285 to be slided out of the T slot 284.

Figure 25:
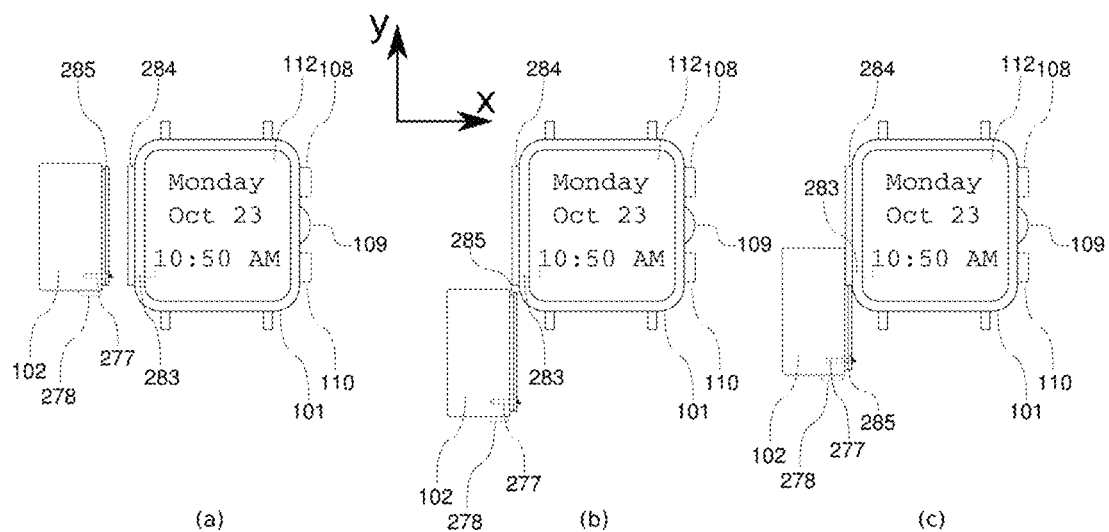
FIG. 25 is the first part of a detailed view of a horizontal slide-in watch module connector.

FIG. 25 illustrates the details of the initial stages of the insertion of a module 102 with a T connector 285 into a watch 101 with a T slot 284. FIG. 25(*a*) illustrates the module 102 side by side with the watch 102. For the insertion to occur properly, however, the module 102 must be aligned to slide into the watch 101 on the Y axis as shown in FIG. 25(*b*). FIG. 25(*b*) shows that the T connector 285 is aligned with the T slot 284. FIG. 25(*c*) shows the T connector 285 starting to slide into the T slot 284. The user can, for instance, hold the module between the thumb and index of the hand from the opposite arm where the watch is worn, align the top of the T connector 285 with the bottom of the T slot 284, start pushing the T connector 285 into the T slot 284 while still holding with both fingers, and then rely primarily on their thumb to continue pushing the module 102 all the way into the T slot 284.

Figure 26:
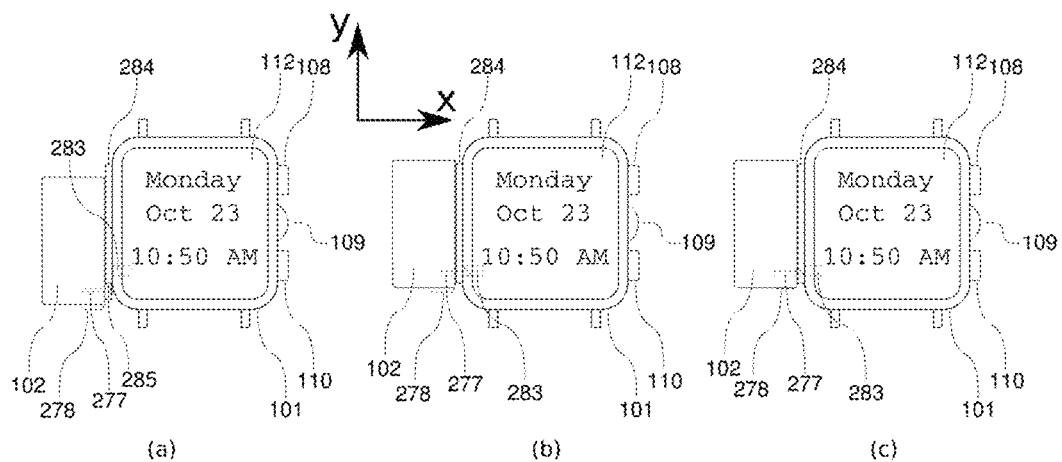
FIG. 26 is the second part of a detailed view of a horizontal slide-in watch module connector.

FIG. 26 illustrates the details of the last stages of the insertion and then removal of a module 102 with a T connector 285 into a watch 101 with a T slot 284. FIG. 26(*a*) shows that as the module's 102 T connector 285 continues to slides into the watch's 101 T slot 284, the beveled tip of the spring-loaded latch 277 makes contact with the watch's 101 body, which causes the latch 277 to start retracting into the module 102. FIG. 26(*b*) illustrates the fully-inserted module 102 with the spring-loaded latch 277 having expanded into the recessed space 283 and therefore having locked the module 102 in place. By pressing on the release button 278, the latch 277 is made to retract into the module's 102 body thereby enabling the module's 102 T connector 285 (not visible) to slide out of the T slot 284. The user can, for instance, press on the release button 278 while dragging the module 102 down the Y axis to slide it out of the T slot 284.

Several variations on this embodiment are possible without departing from the teachings of the present disclosure. The T slot 284 may be on the right instead of the left side of the watch 101. The T slot 284 may also be flipped so that module is inserted from the top instead of the bottom of the watch. The latch 277 and recessed space 283 may also be reversed with the latch 277 and corresponding button 278 being in the watch 101 while the recessed space 283 being in the module 102.

Furthermore, FIGS. 24, 25 and 26 illustrated a T connector 285 and T slot 284 that were aligned on the Y axis, thereby resulting in a configuration where module insertion and removal occurs by sliding the module along the top and bottom of the watch. Such T connectors and slots may in fact be aligned along the other axes as well. Nothing precludes a module from being inserted along the Z axis, for example, thereby being inserted from front towards the back of the watch. In an embodiment where such a Z-oriented connector is found on the side of a watch, for example, the T slot's width would be much larger than its length, unlike the T slot 284 in FIGS. 24, 25, and 26 which features a much larger length than width. Such a "vertically" inserted WMC embodiment could feature a spring-loaded latch locking mechanism much like the one illustrated in FIGS. 24, 25 and 26 except it would be activated along the Z axis instead of the Y axis. Similar embodiments could also be envisioned along the X axis with, for example, parts of the module connector sliding onto the front of the watch or sliding into a connector area within the watch aligned on the X axis. A module connector may, for instance, mimic a conventional key. The L-shaped module would then have its "key" part inserted along the X axis into a matching connector inside the body of the watch and then the module would be rotated around the X axis to one side to lock it into position on the side of the watch.

In comparison to the previous embodiments, this embodiment has a slightly different set of mechanical and user experience features. Given that the T connector contact surface happens across almost the entire length of the Y axis and, on one side, on almost the entire length of the Z axis, and given that the T connector connects on both sides of the Z axis, this WMC embodiment exhibits similar, if not better, features with regards to resistance to axial or cross-axial forces as the embodiments first presented in FIGS. 1 and 10. It also features a single latch 277 as in the rotating designs. Yet, still, it can be operated using a single hand (user presses on release button 278 with thumb and pushes "down" on the module with index) and its locking mechanism can be made to be non-trivial to operate; for example, the release button 278 may be flush or slightly recessed with the module's 102 body, thereby requiring the user the press "inside" the body to release the module 102. Furthermore, the shapes to be manufactured may be simpler than those presented in previous designs as they are constructed using relatively well-understood ("T" shaped) and uniform/constant geometries.

As illustrated by the previous embodiments and examples, a WMC may in fact be designed in any number of different ways without departing from the teachings of the present disclosure. Generally, WMCs can be categorized as consisting of operating based on of three basics principles, or any combination thereof.

First, a module may be made to connect to a watch by translating it towards or away from the watch on one of the axes. Such is the case of the embodiments illustrated or detailed in FIG. 1 through 15 and 18 through 20. Though those embodiments primarily focus on more or less center-to-center X axis translations, both Y and Z axis translations are possible as well. An example of a possible Y translation is illustrated in FIG. 6. While no illustration features a centered Z translation, such embodiments are alluded to previously and are hereby called out again. Translations may also occur on a diagonal or any other arc using a combination of the axes.

Second, a module may be made to hook onto a corner or point of the watch and rotate around an axis. Such is the case of the embodiments illustrated or detailed in FIG. 21 through 23. Though those embodiments primarily focus on Z axis rotations, both Y and X axis rotations are possible as well. While no illustration features a Y or X rotations, such embodiments are alluded to previously and are hereby called out again. Rotations may also occur on a diagonal or any other arc using a combination of the axes. In most cases, a lock can be used on the contact point at the far end of the rotation, on a plane perpendicular to the rotation axis and coplanar to the contact surface or area between the module and the watch.

Third, a module may be made to connect to a watch by sliding against a matching connector on any of the side of the watch along any of the axes. This is effectively an off-center translation between the module and the watch, and is illustrated in FIG. 24 through 26. Though those embodiments primarily focus on Y axis side-to-side sliding, both Z and X axis side-to-side are possible as well, as alluded to previously and as hereby called out again. As in the case of the center-to-center translations, off-center translations may also occur on a diagonal or any other arc using a combination of the axes.

There is nothing, in fact, precluding a WMC from being designed around a combination of several of these basic principles nor as a sequence of several steps based on the combination of such basic principles. The guiding principle of a WMC is that it permits the connection of a module to a watch both mechanically and electrically, possibly by way of applying some form of translation and/or rotation of the module against the watch on one of at least one of the axes or a transformation thereof, wherein: a) the mechanical link can be operable to be sufficiently secured to enable the user of the combined watch and module to operate such a combination in the same environment, activities, constraints, wear and tear as a conventional watch, b) the electrical link enables the transferring of information and/or signals and/or power between the watch and any of a plurality of modules, c) a module may be attached to and removed from the watch without requiring the watch to be removed from the user's wrist, and d) preferably, but not necessarily, at least the electrical link between the module and the watch is water-resistant.

Regardless of the specific operating principles on which any WMC embodiment is designed, most WMC embodiments may be further characterized or analyzed as a function of:

a) Ease of use and operation: namely whether the user may be able to insert and remove the module and operate any corresponding locking mechanism with a single hand without having to remove the watch.

b) Sturdiness: namely the degree to which a module attached to a watch through a WMC can resist torsion, pulling, twisting, tearing, or any other force in any direction or on or across any axis a regular watch may be subjected to.

c) Resistance to daily wear and tear: namely whether or how the mechanical, electrical or sealing features of a WMC may be impacted by normal regular use such as connecting and disconnecting modules, which may be specified as a limited set of "mating cycles", or accidental damage due to such things as exposed contacts rubbing against daily objects such as keys, pocket change or articles in a bag. O-rings especially may need frequent replacement, even if the rest of the materials are chosen for long lifetime.

d) Resistance to water and debris: namely how sensitive or resistant a WMC once it's attached and, also, when it's not attached and/or is exposed. Some WMCs may require dummy "modules" to be attached at all times to a watch to avoid ingress issues, for example.

e) Cost: namely with regards to materials and manufacturing. Some WMC designs may, as alluded to earlier, be more expensive to manufacture, by requiring tighter tolerances, more steps or more sophisticated craftsmanship for instance, than others just due to the geometries and the number of parts involved. Others may be more expensive simply because they require more expensive materials to operate properly. Cost is likely more important on the module side than on the watch side as a user is likely to have several module for a single watch.

f) Materials: namely some designs may not be as feasible or as solid using some materials as with others. Some plastics, as mentioned earlier for instance, may be less tolerant to certain forces than other materials.

g) Convenience of carrying around: namely whether any shapes or edges protruding from the WMC may be inconvenient or problematic such as when a module is carried around in pockets or in a bag. WMCs with sharp corners, for example, may cause scratches to skin or surfaces. WMCs with protruding features may easily intertwine with threads from clothing or wires in a bag.

Ideally, WMC designs should aim to be easy to use and operate, sturdy, resistant to daily wear and tear, resistant to water and debris, inexpensive to manufacture, made of appropriate materials and convenient to carry around. Several designs meeting such goals may be based on some of the example embodiments detailed in the present disclosure, a combination thereof or, more generally, the teachings of the present disclosure as will be apparent to those skilled in the art.

As mentioned earlier, the electrical connector can vary greatly without departing from the teachings of the present disclosure. Any connector that is sufficient to establish means for transferring data and/or signals of any sort and/or power between the module and the watch is considered usable within the scope of the present disclosure. This includes the sprint-loaded pins and matching metal contacts presented earlier (sometimes referred to as "pogo" pins), or any other electrical mating connector types may be used, possibly inspired by or derived from existing connectors such as USB, D-subminiature, registered jack, DIN, slot/edge, headphone jack, or any other connector technology on the market. Wikipedia's page on "Electrical connector" (https://en.wikipedia.org/wiki/Electrical/connector) as retrieved contemporaneously with the filing of the present disclosure contains a fairly long list of connectors that could be used as a basis for designing the electrical endpoints of a WMC. Any number of these could be used in combination to variations on some of the embodiments presented above.

Instead of the spring-loaded contacts described in the embodiment presented in FIG. 24 through 26, for example, a spring-loaded edge connector that remains retracted in the module's body until the module is fully inserted into the watch could be used. The watch could then have a matching slot connector that connects to the module's edge connector once it springs out of the module at connection time. By pressing the release button, the edge connector would retract back into the module to allow module removal. A similar edge and slot connector-based design could also be used for the embodiments illustrated in many of the other designs, without necessarily requiring the edge connector to be spring-loaded.

The centered translation embodiments in FIG. 1 through 15 and 18 through 20, for example, could easily rely on fixed edge connector mated to slot connectors. This would resemble what's done with USB connectors, PCI cards, legacy ISA cards, DIMM connectors, SOM to breakout board connectors, FPC cables, SATA connectors, and several other connectors. Fixed pin-based connectors could be used as well, such as in the case of legacy PCMCIA cards, PCB board headers, D-subminiature, BNC, RCA, and many other connector types. Ribbon contacts or contacts made of series of bands of metal, be they flat or in strings, such as those found in micro ribbon connectors (also known as "Centronics" connectors), registered jack plugs (like RJ-45), board-to-board connectors or some chip sockets could also be used. More unconventional connectors could also be entertained such as an enhanced audio-jack-like connector supporting several parallel signals, or even optical connectors, such as those used for fiber-optic cables, or even yet still experimental connectors based on capacitive contacts such as those presented in early prototypes of the Google Project Ara concept phone.

Any of the aforementioned electric or electronic connectors, or any new ones introduces in the future, may be used as examples for devising an electrical connector or even possibly used as-is or in part for any of the WMC embodiments discussed, presented or inferred from the above without departing from the teachings of the present disclosure. Varying length contacts could, for instance, be inspired from those used by several industry connectors like USB, with power contacts making contact first prior to data connects making contact. In addition, any number of considerations may need to be made for proper choice or design of the electrical contacts to be used including, but not limited to, fit-for-purpose, pitch, mating cycles, resistance to wear and tear, ease of manufacturing, etc.

Other variations on the electrical contacts may include:

Ensuring that either the electrical connector itself or the internal circuitry to which it is connected to is capable to detect and/or deal with shorts, such as may accidentally happen if several of the connectors come into simultaneous contact with a single conductive surface or liquid.

Designing electrical contacts that make contact at 45 degree angles, or any non-90 degree angle, between any two axes.

Designing electrical contacts that have complex, non-planar (i.e. "flat") shapes.

Implementing an insertion/removal "handshake" (or designing electrical connectors that facilitate such handshaking) for proper power and/or data connection between both sides of the WMC.

FIG. 27 illustrates an example embodiment of a module 302 and watch 308 connected 399 utilizing a WMC. In this case, the module 302 comprises a microcontroller (MCU) 383 connected to some RAM 381, storage 382 and peripherals 330. The watch 308 comprises a System-on-Chip (Soc) 370 connected to some RAM 371, storage 372, general I/O 376, networking hardware 375 and a power management IC (PMIC) 373, which itself is connected to a battery 374. Though in this embodiment the power for the module 302 is provided by the watch 308 over the connector 399, the module 302 may itself comprise a battery and possibly even supply power over the connector 399 to the watch 308. The various contacts comprised in the connector 399 may be collectively used to implement a custom bus protocol or they may be used to transport an existing protocol or bus, such as one of those previous mentioned or any industry standard one, repurposed or reconfigured for custom connector embodiments based on the teachings of the present disclosure. By using USB, for example, module 302 and watch 308 designs could benefit from the existence of a vast number of ICs, chips and processors that already support that standard.

In all cases, the electrical connectors have at least two main sides. On one side the connector is capable of connecting to the corresponding opposite gendered connector (i.e. female side in the case of a male connector or male side in the case of a female connector) and, on the other side, it is made to be connectable in some way, shape or form to a PCB or circuit of the device they are connecting to. In the case of the watch, for instance, the internal side (the one inside the housing of the device featuring the WMC) of the electrical connector part of the WMC could be connected to the PCB holding the watch's main ICs or some form of wire or ribbon cable leading or connecting to it. The fashion by which the internal side of a WMC connects electrically with the electronics of the device that includes a WMC may resemble that of any existing electrical connector found on the market or it may be custom to that WMC embodiment. The internal side would generally, but not necessarily, connected to the internal electronics at factory time. In contrast, the external side of the electrical connector of the WMC could be connected and disconnected as necessary from the matching opposite connector at any time as explained throughout the present disclosure.

If included, the seal connector between a module and a watch would typically, but not necessarily, be provided by way of an o-ring or some form of elastomer that once mated between the module and the watch provides some degree of water resistance. For this to be beneficial, it is assumed that both the module and the watch's housings/cases would themselves be water resistant, otherwise the seal between the module and the watch is of no use. How the module and/or watch are made to be water resistant to any degree is outside the scope of the present disclosure. However, any means of sealing a link between a module and a watch using a WMC may be used without departing from the teachings of the present disclosure. A seal may for instance, not necessarily be made of a o-ring, but rather of a complimentary pair of custom-shaped elastomer parts each serving on its corresponding side of the connection between a module and a watch. Wikipedia's page on "O-ring" (https://en.wikipedia.org/wiki/O-ring) as retrieved contemporaneously with the filing of the present disclosure contains a fairly long list of materials that could be used as a basis for designing o-rings, and probably other custom-shaped seals as well, for a WMC.

As mentioned earlier, whereas the embodiments presented here illustrate primarily square-shaped watches, a WMC may be designed and used for watches of any geometric shape. If a watch is round then a WMC may be designed for it as C-shaped without departing from the teachings of the present disclosure. The same is true for any other shape including irregular shapes such as stars, skeletons, pumpkins, ovals, etc.

Several other enhancements are also possible without departing from the teachings of the current disclosure. Here are, in no specific order, a list of features, additions or modifications that could be made to the module-driven smartwatch:

An adapter may be provided to enable modules meant to be connected to watches to actually connect into computers and/or smartphones Modules may also have USB connectors in addition to connectors for connecting to watches. This could be used for charging and allowing connection to PCs, whether the module is connected to the watch or not.

An interposing dongle could be provided for attaching between a module and a watch for providing extra functionality such as a USB connector to connect both the module and the watch to a PC while a module is connected to the watch, if the module doesn't itself have a USB connector for instance, or it could be used for debugging capabilities, enabling module developers to more easily develop and/or debug their modules and or module-related software while being connected to a working watch.

It will be understood that numerous modifications and changes in form and detail may be made to the embodiments of the presently disclosed connector and method. It is contemplated that numerous other configurations of the connector and method may be used, and the modules ("modules" as in "abstractions" or "blocks", not as used earlier in this disclosure) of the connector and method may be selected from numerous modules other than those specifically disclosed. Therefore, the above description should not be construed as limiting the disclosed connector and method, but merely as exemplification of the various embodiments thereof. Those skilled in the art will envisioned numerous modifications within the scope of the present disclosure.

What is claimed is:

1. A connector system for connecting a module to a wrist-wearable device, the connector system comprising:
   the wrist-wearable device providing an initial set of functionality; and
   the module providing a substantially independent set of functionality;
   wherein:
      the wrist-wearable device comprises a functionality-pairing connector;
      the module comprises an opposite functionality-pairing connector;
      the functionality-pairing connector is detachably connectable to the opposite functionality-pairing connector while the wrist-wearable device remains actively worn by a user; and
      by connecting the functionality-pairing connector to the opposite functionality-pairing connector:
         the module becomes directly mounted against the wrist-wearable device while still the combined result remains wrist-wearable; and
         the module's substantially independent set of functionality becomes combinable with the wrist-wearable device's initial set of functionality;
      thereby enabling a plurality of functionally-different such modules to be connectable to the wrist-wearable device.

2. The connector system of claim 1 wherein the functionality-pairing connector and the opposite functionality-pairing connector each further comprise matching:
   mechanical features; and
   electrical features;
   wherein:
      the functionality-pairing connector is connectable to the opposite functionality-pairing connector both mechanically and electrically; and
      once connected, the module and the wrist-wearable device are electrically connected.

3. The connector system of claim 2, wherein:
   one of at least the functionality-pairing connector or the opposite functionality-pairing connector further comprises a locking mechanism;
   one of at least the functionality-pairing connector or the opposite functionality-pairing connector further comprises a release mechanism;
   the locking mechanism locks the module to the wrist-wearable device upon successful connection of the module to the wrist-wearable device; and
   the release mechanism is operable to unlock the module from the wrist-wearable device while said wrist-wearable device remains actively worn by the user.

4. The connector system of claim 3, wherein the mechanical features of both the functionality-pairing connector and the opposite functionality-pairing connector connect at at least two opposing points on a first axis.

5. The connector system of claim 4, wherein the mechanical features of both the functionality-pairing connector and the opposite functionality-pairing connector further connect at at least two opposing points on a second axis.

6. The connector system of claim 5, wherein the locking mechanism further comprises matching lips and slots wherein:
   one of the lips or the slots is found on the module and the other is found on the wrist-wearable device;
   the shape of each lip matches the space found within the corresponding slot;
   each slot contains a spring-loaded latch pin;
   each lip contains a hole matching the size and orientation of the spring-loaded latch pin;
   each lip and corresponding spring-loaded latch pin may be beveled at matching angles to facilitate the retraction of the spring-loaded latch pin when the lip is inserted into the slot;
   by inserting each lip into its corresponding slot, the lip causes the spring-loaded latch pin to retract and descend under the lip as the lip progresses through the slot until the lip is inserted sufficiently far into the slot for the hole to align with the spring-loaded latch pin, thereby causing the spring-loaded latch pin to return to its original position by expanding through the hole, and therefore locking the lip in place; and
   once all lips are locked into their corresponding slots then the module is locked against the wrist-wearable device.

7. The connector system of claim 6, wherein:
the electrical features further comprise male electrical features and female electrical features;
the male electrical features comprise a non-conductive tongue with a set of metal contact points at its tip, an o-ring surrounding the non-conductive tongue and a shield recessed space;
the female electrical features comprise a pin recessed space matching the size and shape of the male electrical features non-conductive tongue, a set of spring-loaded pins matching in number, in size and in location the male electrical features metal contact points, and a shield surrounding the pin recessed space and the spring-loaded pins, and matching the size and shape of the male electrical features shield recessed space; and
by inserting the male electrical features into the female electrical features:
   the male electrical features metal contact points come into contact and compress the female electrical features spring-loaded pins and form an electrical connection;
   the male electrical features non-conductive tongue fits into the female electrical features pin recessed space; and
   the female electrical features shield fits into the male electrical features shield recessed space and compresses the male electrical features o-ring thereby creating a water-resistant seal.

8. The connector system of claim 5, wherein the locking mechanism further comprises matching pegs and holes wherein:
   one of the pegs or the holes is found on the module and the other is found on the wrist-wearable device;
   the shape of each peg matches the space found within the corresponding hole;

each hole contains a pair of spring-loaded latch pins;
each peg contains a groove matching the size and orientation of the spring-loaded latch pins;
each peg and corresponding spring-loaded latch pins may be beveled at matching angles to facilitate the retraction of the spring-loaded latch pin when the peg is inserted into the hole;
by inserting each peg into its corresponding hole, the peg causes the spring-loaded latch pins to retract and make way for the peg as the peg progresses through the hole until the peg is inserted sufficiently far into the hole for the groove to align with the spring-loaded latch pins, thereby causing the spring-loaded latch pins to return to their original position by expanding into the groove, and therefore locking the peg in place; and
once all pegs are locked into their corresponding holes then the module is locked against the wrist-wearable device.

9. The connector system of claim 5, wherein the locking mechanism further comprises a matched T connector and T slot wherein:
one of the T connector or T slot is found on the module and the other is found on the wrist-wearable device;
the shape of the T connector matches the space found within the corresponding T slot;
one of the T connector or the T slot contains a spring-loaded latch pin and the other a corresponding recessed space;
the spring-loaded latch pin may be beveled to match the insertion angle of the opposing functionality-pairing connector to facilitate the retraction of the spring-loaded latch pin when the T connector is inserted into the T slot; and
by inserting the T connector into the T slot, the contact between connectors causes the spring-loaded latch pin to retract and clear the way for the T connector to continue its progresses through the T slot until the T connector is inserted sufficiently far into the T slot for the recessed space to align with the spring-loaded latch pin, thereby causing the spring-loaded latch pin to return to its original position by expanding through the recessed space, and therefore locking the T connector in place and the module against the wrist-wearable device.

10. The connector system of claim 4, wherein the locking mechanism further comprises matching spring-loaded latches and recessed spaces wherein:
one of the spring-loaded latches or the recessed spaces is found on the module and the other is found on the wrist wearable device;
the shape of each spring-loaded latch matches the space found within the corresponding recessed space;
each recessed space contains a latch-tip-shaped area;
each spring-loaded latch contains a tip matching the size and orientation of the latch-tip-shaped area;
each spring-loaded latch and corresponding recessed space may be beveled at matching angles to facilitate the retraction of the spring-loaded latch when it is inserted into the recessed space;
by inserting each spring-loaded latch into its corresponding recessed space, the spring-loaded latch translates perpendicularly to the direction of insertion in order to allow it to continue its progress through the recessed space until the tip of the spring-loaded latch is inserted sufficiently far into the recessed space for the latch-tip-shaped area to align with the tip of the spring-loaded latch, thereby causing the spring-loaded latch to return to its original position by allowing the tip of the spring-loaded latch to expand through the latch-tip-shaped area, and therefore locking the spring-loaded latches in place; and
once all spring-loaded latches are locked into their corresponding recessed spaces then the module is locked against the wrist-wearable device.

11. The connector system of claim 10, wherein one of the spring-loaded latches and corresponding recessed spaces is replaced with a hook and pivot wherein:
one of the hook or pivot is found on the module and the other is found on the wrist-wearable device;
the shape of the hook matches the shape of the pivot;
by hooking the hook to the pivot, the module is operable to rotate around the pivot to allow a spring-loaded latch on the opposing side of the module to come in contact with the wrist-wearable device; and
when the spring-loaded latch is locked into its corresponding recessed space, the hook cannot be removed from the pivot, therefore locking the module against the wrist-wearable device.

12. The connector system of claim 4, wherein the locking mechanism further comprises matching threaded pins and threaded holes wherein:
one of the threaded pins or the threaded holes is found on the module and the other is found on the wrist-wearable device;
the shape of each threaded pin matches the space found within the corresponding threaded hole;
each threaded pin is operable using a matching rotating wheel;
by inserting each threaded pin in its corresponding threaded hole, a user may operate the rotating wheel to rotate the threaded pin and have it screw into the threaded hole; and
once all threaded pins are fully screwed into their corresponding threaded holes then the module is locked against the wrist-wearable device.

13. The connector system of claim 3, wherein the release mechanism requires a deliberate and active action by the user to unlock the module.

14. The connector system of claim 2, wherein the electrical connection between the module and the wrist-wearable device includes a plurality of individual electrical connectors.

15. The connector system of claim 14, wherein some of the plurality of electrical connectors form a bus.

16. The connector system of claim 15, wherein the bus is derived from the USB standard.

17. The connector system of claim 14, wherein some of the plurality of electrical connectors carry power signals.

18. The connector system of claim 14, wherein the individual connectors are one of or a combination of a plurality of, or are based on:
pogo pins;
straight pins and headers;
edge and slot connectors;
ribbon or metal strip contacts;
audio jack;
optical connector; and
capacitive connector or connectors.

19. The connector system of claim 1, wherein one of or both the functionality-pairing connector and the opposite functionality-pairing connector further comprise sealing features.

20. The connector system of claim 19, wherein the sealing features is one of an o-ring or an elastomeric part.

21. The connector system of claim 20, wherein the sealing features are exposed and accessible to the user, thereby permitting their replacement without requiring the disassembly of either the module or the wrist-wearable device.

22. The connector system of claim 2 wherein the module further comprises:
an at least one processor;
an at least one hardware memory device; and
an at least one storage device;
wherein the at least one processor is configured for interfacing with the wrist-wearable device through the electrical features of the opposite functionality-pairing connector found in the module.

23. The connector system of claim 22 wherein the module further comprises an at least one peripheral connected to the at least one processor.

24. The connector system of claim 23 wherein the module further comprises an at least one battery for powering the at least one processor, the at least one hardware memory device, the at least one storage device and the at least one peripheral.

25. A module comprising a connector for attaching to a wrist-wearable device wherein:
the wrist-wearable device provides an initial set of functionality;
the module provides a substantially independent set of functionality;
the module comprises a mechanical and electrical pairing connector matching an opposite mechanical and electrical pairing connector found on the wrist-wearable device;
the module's mechanical and electrical pairing connector is detachably connectable to the opposite mechanical and electrical pairing connector found on the wrist-wearable device while said wrist-wearable device remains actively worn by a user;
the module's mechanical and electrical pairing connector further comprises mechanical features for locking against the opposite mechanical and electrical pairing connector; and
contemporaneously with the module's connection to the wrist-wearable device using the mechanical and electrical pairing connector:
the module becomes directly mounted against the wrist-wearable device while still the combined result remains wrist-wearable;
the module becomes electrically connected to the wrist-wearable device;
the mechanical and electrical pairing connector becomes locked against the opposite mechanical and electrical pairing connector; and
the module's substantially independent set of functionality becomes combinable with the wrist-wearable device's initial set of functionality.

26. The module of claim 25 further comprising:
an at least one processor;
an at least one hardware memory device;
an at least one storage device; and
an at least one peripheral;
wherein:
the at least one hardware memory device, the at least one storage device and the at least one peripheral are connectable to the at least one processor; and
the at least one processor is configured for interfacing with the wrist-wearable device through the electrical features of the mechanical and electrical pairing connector found in the module.

27. The module of claim 26 wherein the module's body is sealed for preventing water and dirt from penetrating inside the module.

28. The module of claim 26 wherein said module's functionality is operable with a single user hand.

29. A wrist-wearable device comprising an at least one mechanical and electrical pairing connector for attaching a plurality of modules wherein:
the wrist-wearable device provides an initial set of functionality;
each module may provide a substantially independent set of functionality;
the wrist-wearable device's at least one mechanical and electrical pairing connector matches an opposite mechanical and electrical pairing connector found on each module;
the wrist-wearable device's at least one mechanical and electrical pairing connector can be detachably connected to by the opposite mechanical and electrical pairing connector found on each module while said wrist-wearable remains actively worn by a user;
the wrist-wearable device's at least one mechanical and electrical pairing connector further comprises mechanical features for opposite mechanical and electrical pairing connectors to lock against; and
contemporaneously with a module's connection to the wrist-wearable device using the at least one mechanical and electrical pairing connector:
said module becomes directly mounted against the wrist-wearable device while still the combined result remains wrist-wearable;
said module becomes electrically connected to the wrist-wearable device;
the opposite mechanical and electrical pairing connector becomes locked against the at least one mechanical and electrical pairing connector; and
said module's substantially independent set of functionality becomes combinable with the wrist-wearable device's initial set of functionality.

30. The wrist-wearable device of claim 29 wherein the mechanical and electrical pairing connector is situated on an edge or face of said wrist-wearable device that isn't obstructed by a wrist strap.

31. The wrist-wearable device of claim 29 further comprising smartwatch capabilities.

32. The wrist-wearable device of claim 31 further comprising software capabilities for interfacing with a plurality of modules.

* * * * *